United States Patent
Villalpando et al.

(10) Patent No.: US 12,216,339 B2
(45) Date of Patent: *Feb. 4, 2025

(54) EYEWEAR SYSTEMS, APPARATUS, AND METHODS FOR PROVIDING ASSISTANCE TO A USER

(71) Applicant: Solos Technology Limited, Hong Kong (HK)

(72) Inventors: Ernesto Carlos Martinez Villalpando, Shrewsbury, MA (US); Chiu Ming So, Hong Kong (HK); Kwok Wah Law, Hong Kong (HK); Wai Kuen Cheung, Hong Kong (HK)

(*) Notice: Subject to any disclaimer, the term of this patent is extended or adjusted under 35 U.S.C. 154(b) by 0 days.

This patent is subject to a terminal disclaimer.

(21) Appl. No.: 18/517,910

(22) Filed: Nov. 22, 2023

(65) Prior Publication Data

US 2024/0094556 A1 Mar. 21, 2024

Related U.S. Application Data

(63) Continuation of application No. 16/736,593, filed on Jan. 7, 2020, now Pat. No. 11,835,798, which is a continuation-in-part of application No. 16/711,340, filed on Dec. 11, 2019, now Pat. No. 11,796,833.

(60) Provisional application No. 62/873,889, filed on Jul. 13, 2019, provisional application No. 62/789,818, (Continued)

(51) Int. Cl.
| | |
|---|---|
| *G02C 5/00* | (2006.01) |
| *G02C 11/00* | (2006.01) |
| *G06F 3/16* | (2006.01) |
| *H04W 4/02* | (2018.01) |
| *H04W 4/38* | (2018.01) |

(52) U.S. Cl.
CPC ............. *G02C 5/001* (2013.01); *G02C 11/10* (2013.01); *G06F 3/167* (2013.01); *H04W 4/026* (2013.01); *H04W 4/38* (2018.02); *G02C 2200/08* (2013.01)

(58) Field of Classification Search
CPC ......... G02C 5/001; G02C 5/126; G02C 5/14; G02C 11/10; G02C 11/06; G02C 2200/08; G02C 2200/16; G02C 2200/02; G02C 3/006; G06F 3/167; H04W 4/026; H04W 4/38
USPC ......................................................... 351/158
See application file for complete search history.

(56) References Cited

U.S. PATENT DOCUMENTS

| | | |
|---|---|---|
| 7,192,136 B2 | 3/2007 | Howell et al. |
| 7,255,437 B2 | 8/2007 | Howell et al. |
| 7,380,936 B2 | 6/2008 | Howell et al. |

(Continued)

FOREIGN PATENT DOCUMENTS

| | | |
|---|---|---|
| WO | 2020038479 A1 | 2/2020 |
| WO | 2020206775 A1 | 10/2020 |

*Primary Examiner* — William R Alexander
(74) *Attorney, Agent, or Firm* — Caldwell Intellectual Property Law

(57) ABSTRACT

Systems, apparatuses, and methods are taught that provide assistance to a user through an eyewear device. Data is received from a first sensor. The first sensor is incorporated into an eyewear device. The first sensor measures a parameter related to the user. A state of the user is analyzed using the data. Assistance is provided to the user. The assistance is in a form of feedback, and the feedback is related to the state of the user. The assistance can also be related to a context of the user and a state of the user. The context of the user is determined from the data.

16 Claims, 25 Drawing Sheets

Related U.S. Application Data filed on Jan. 8, 2019, provisional application No. 62/778,709, filed on Dec. 12, 2018.

(56) References Cited

U.S. PATENT DOCUMENTS

| | | |
|---|---|---|
| 7,401,918 B2 | 7/2008 | Howell et al. |
| 7,438,410 B1 | 10/2008 | Howell et al. |
| 7,481,531 B2 | 1/2009 | Howell et al. |
| 7,500,746 B1 | 3/2009 | Howell et al. |
| 7,500,747 B2 | 3/2009 | Howell et al. |
| 7,581,833 B2 | 9/2009 | Howell et al. |
| 7,621,634 B2 | 11/2009 | Howell et al. |
| 7,677,723 B2 | 3/2010 | Howell et al. |
| 7,760,896 B2 | 7/2010 | Medveczky |
| 7,771,046 B2 | 8/2010 | Howell et al. |
| 7,792,552 B2 | 9/2010 | Thomas et al. |
| 7,806,525 B2 | 10/2010 | Howell et al. |
| 7,922,321 B2 | 4/2011 | Howell et al. |
| 8,109,629 B2 | 2/2012 | Howell et al. |
| 8,337,013 B2 | 12/2012 | Howell et al. |
| 8,430,507 B2 | 4/2013 | Howell et al. |
| 8,434,863 B2 | 5/2013 | Howell et al. |
| 8,465,151 B2 | 6/2013 | Howell et al. |
| 8,500,271 B2 | 8/2013 | Howell et al. |
| 8,770,742 B2 | 7/2014 | Howell et al. |
| 8,905,542 B2 | 12/2014 | Howell et al. |
| 9,033,493 B2 | 5/2015 | Howell et al. |
| 9,488,520 B2 | 11/2016 | Howell et al. |
| 9,547,184 B2 | 1/2017 | Howell et al. |
| 9,690,121 B2 | 6/2017 | Howell et al. |
| 10,042,186 B2 | 8/2018 | Sweis et al. |
| 10,060,790 B2 | 8/2018 | Howell et al. |
| 10,061,144 B2 | 8/2018 | Howell et al. |
| 10,310,296 B2 | 6/2019 | Howell et al. |
| 10,330,956 B2 | 6/2019 | Howell et al. |
| 10,345,625 B2 | 7/2019 | Howell et al. |
| 10,359,311 B2 | 7/2019 | Howell et al. |
| 10,539,459 B2 | 1/2020 | Howell et al. |
| 10,777,048 B2 | 9/2020 | Howell et al. |
| 11,042,045 B2 | 6/2021 | Chao et al. |
| 11,086,147 B2 | 8/2021 | Howell et al. |
| 11,204,512 B2 | 12/2021 | Howell et al. |
| 11,243,416 B2 | 2/2022 | Howell et al. |
| 11,326,941 B2 | 5/2022 | Howell et al. |
| 11,513,371 B2 | 11/2022 | Howell et al. |
| 11,630,331 B2 | 4/2023 | Howell et al. |
| 11,644,361 B2 | 5/2023 | Howell et al. |
| 11,644,693 B2 | 5/2023 | Howell et al. |
| 2006/0250574 A1* | 11/2006 | Grand ............... G02B 27/0172 351/158 |
| 2007/0030442 A1 | 2/2007 | Howell et al. |
| 2012/0237075 A1 | 9/2012 | East et al. |
| 2013/0250232 A1 | 9/2013 | Belbey et al. |
| 2014/0268008 A1 | 9/2014 | Howell et al. |
| 2014/0347265 A1 | 11/2014 | Aimone et al. |
| 2015/0002808 A1* | 1/2015 | Rizzo, III ......... A61N 1/36046 351/158 |
| 2015/0126845 A1 | 5/2015 | Jin et al. |
| 2015/0172434 A1 | 6/2015 | Kawagishi |
| 2015/0248026 A1 | 9/2015 | Willey et al. |
| 2016/0066847 A1* | 3/2016 | Sales ................... A61B 5/1103 600/595 |
| 2016/0246059 A1 | 8/2016 | Halpin et al. |
| 2016/0299569 A1 | 10/2016 | Fisher et al. |
| 2017/0032646 A1 | 2/2017 | Alameh et al. |
| 2017/0078883 A1 | 3/2017 | Rodriguez |
| 2017/0108715 A1 | 4/2017 | Bauer |
| 2017/0176778 A1 | 6/2017 | Ushakov |
| 2018/0088340 A1 | 3/2018 | Amayeh et al. |
| 2018/0097920 A1 | 4/2018 | Hoellwarth |
| 2018/0103139 A1 | 4/2018 | Griffin |
| 2018/0124497 A1 | 5/2018 | Boesen |
| 2018/0234847 A1 | 8/2018 | Rodriguez |
| 2018/0242064 A1 | 8/2018 | Honeycutt |
| 2019/0097328 A1 | 3/2019 | Yong et al. |
| 2019/0101977 A1 | 4/2019 | Armstrong-Muntner |
| 2019/0158946 A1 | 5/2019 | Honeycutt |
| 2019/0187492 A1 | 6/2019 | Howell et al. |
| 2019/0278110 A1 | 9/2019 | Howell et al. |
| 2019/0297701 A1 | 9/2019 | Cao et al. |
| 2019/0298228 A1* | 10/2019 | Sales ................... G08B 21/0461 |
| 2020/0285069 A1* | 9/2020 | Villalpando ........... H04W 4/026 |
| 2022/0107202 A1 | 4/2022 | Tirosh et al. |
| 2022/0113562 A1 | 4/2022 | Anderson et al. |

\* cited by examiner

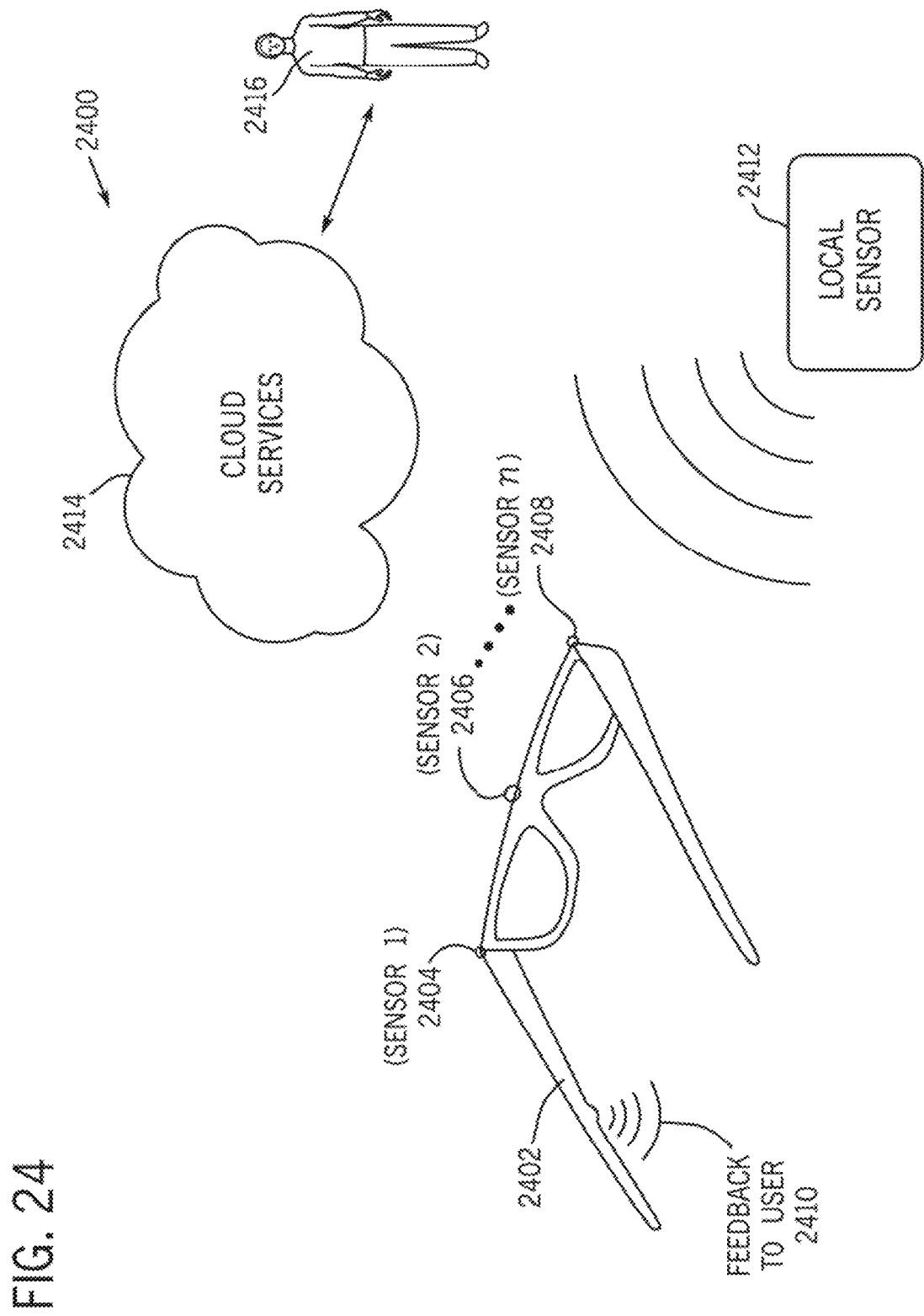

EYEWEAR SYSTEMS, APPARATUS, AND METHODS FOR PROVIDING ASSISTANCE TO A USER

CROSS-REFERENCE TO RELATED APPLICATIONS

This application is a continuation of Non-provisional application Ser. No. 16/736,593 filed on Jan. 7, 2020, and entitled "EYEWEAR SYSTEMS, APPARATUS, AND METHODS FOR PROVIDING ASSISTANCE TO A USER," which the entirety of which is incorporated herein by reference, which is a continuation-in part of Non-provisional application Ser. No. 16/711,340 filed on Dec. 11, 2019, and entitled "MODULARIZED EYEWEAR SYSTEMS, APPARATUS, AND METHODS," which claims the benefit of priority of U.S. Provisional Patent Application Ser. No. 62/778,709, filed on Dec. 12, 2018, and titled "MODULARIZED EYEWEAR SYSTEM WITH INTERCHANGEABLE FRAME AND TEMPLES WITH EMBEDDED ELECTRONICS FOR MOBILE AUDIO-VISUAL AUGMENTED AND ASSISTED REALITY" and U.S. Provisional Patent Application Ser. No. 62/873,889, filed on Jul. 13, 2019, and titled "WEARABLE DEVICES APPARATUSES, SYSTEMS, AND METHODS," which the entireties of which are incorporated herein by reference. Additionally, Non-provisional application Ser. No. 16/736,593 claims the benefit of priority of U.S. Provisional Patent Application Ser. No. 62/789,818 filed on Jan. 8, 2019, and entitled "MODULARIZED EYEWEAR SYSTEM WITH INTERCHANGEABLE FRAME AND TEMPLES WITH EMBEDDED ELECTRONICS FOR AUGMENTED REALITY AND ACTIVITY MONITORING," which the entirety of which is incorporated herein by reference, and U.S. Provisional Patent Application Ser. No. 62/873,889 filed on Jul. 13, 2019, and entitled "WEARABLE DEVICES APPARATUS, SYSTEMS, AND METHODS," which the entirety of which is incorporated herein by reference.

FIELD OF THE INVENTION

The present invention generally relates to the field of eyewear devices. In particular, the present invention is directed to apparatuses, methods, and systems for providing information to a user through a modularized eyewear device.

BACKGROUND

The pace of modern life moves at a fast pace. A person is often placed under the constraint of time and is placed in situations where his or her hands are occupied, and information is not accessible to the person. This can present a problem. Currently available eyewear such as prescription glasses, e.g., prescription reading glasses or prescription sunglasses are expensive and are not readily reconfigured to different user's needs. This can present a problem. Personalized sound transmission is often done with an occlusive in ear device known as an earphone or earbud. Such a device obstructs the ear canal and can interfere with a user's hearing of far field and near field sounds. This can present a problem. Thus, problems exist that require technical solutions that use technical means to produce technical effects.

SUMMARY OF THE DISCLOSURE

In an aspect, a system, apparatus, and method for execution by a data processing system to provide assistance to a user through an eyewear device is described. The system includes a voice interface, the voice interface has a microphone and a speaker, the voice interface to receive user commands and to provide assistance to the user, a sensor data input, the sensor data input to receive sensor data, a processor, the processor is in electrical communication with the voice interface and the sensor data, and a computer program for processing the sensor data. The computer program and the processor cause the data processing system to receive first data from a first sensor incorporated into the eyewear device, wherein the first sensor is configured to measure a parameter related to the user. The data processing system is further configured to determining a context for the user wherein the determining uses the first data, analyzing a state of the user, wherein the analyzing uses the first data, and providing assistance to the user, the assistance is related to the context and the state.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 24 illustrates a system for providing assistance to a user of an eyewear device, according to embodiments of the invention.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following detailed description of embodiments of the invention, reference is made to the accompanying drawings, in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

In one or more embodiments, methods, apparatuses, and systems are described, that provide modularization of an eyewear system for a user. As described in the description of embodiments below, various combinations and configurations of electronics are taught for incorporation into eyewear devices. Some electronics configurations are removably couplable to an eyewear device. In some embodiments, an electronics configuration is built-into an eyewear device. In yet other embodiments, a behind the neck module assembly is releasably couplable with an eyewear device. In various embodiments, the modularized reconfigurable eyewear devices provide information to a user through the eyewear device. As used in this description of embodiments, information includes streaming audio in the form of music, information also includes parameters of a user's biology (e.g., biometrics of physiology, biomechanics, etc.) such as, but not limited to; heart rate, breathing rate, posture, steps, cadence, etc. Information also includes notifications and information of interest to a user from digital applications embedded in a mobile computing platform (i.e., smart phones, Internet of Things (iOT) devices, etc.) or from environmental or spatial context based on external sensory information such as, but not limited to; geographical positioning data, or information on a vehicle that a user is using such as; revolutions per minute (RPM) of a bicycle, engine parameters such as RPM, oil pressure, cooling water temperature, wind speed, depth of water, air speed, etc. In various embodiments, information is presented to a user through an eyewear device by, for example, an audio broadcast that a user hears and a video broadcast to a display that the user sees in the eyewear device or sees as an image as projected onto a pupil of the user's eye. Thus, information is to be given an expansive meaning within the scope of embodiments taught herein.

Figure 1:
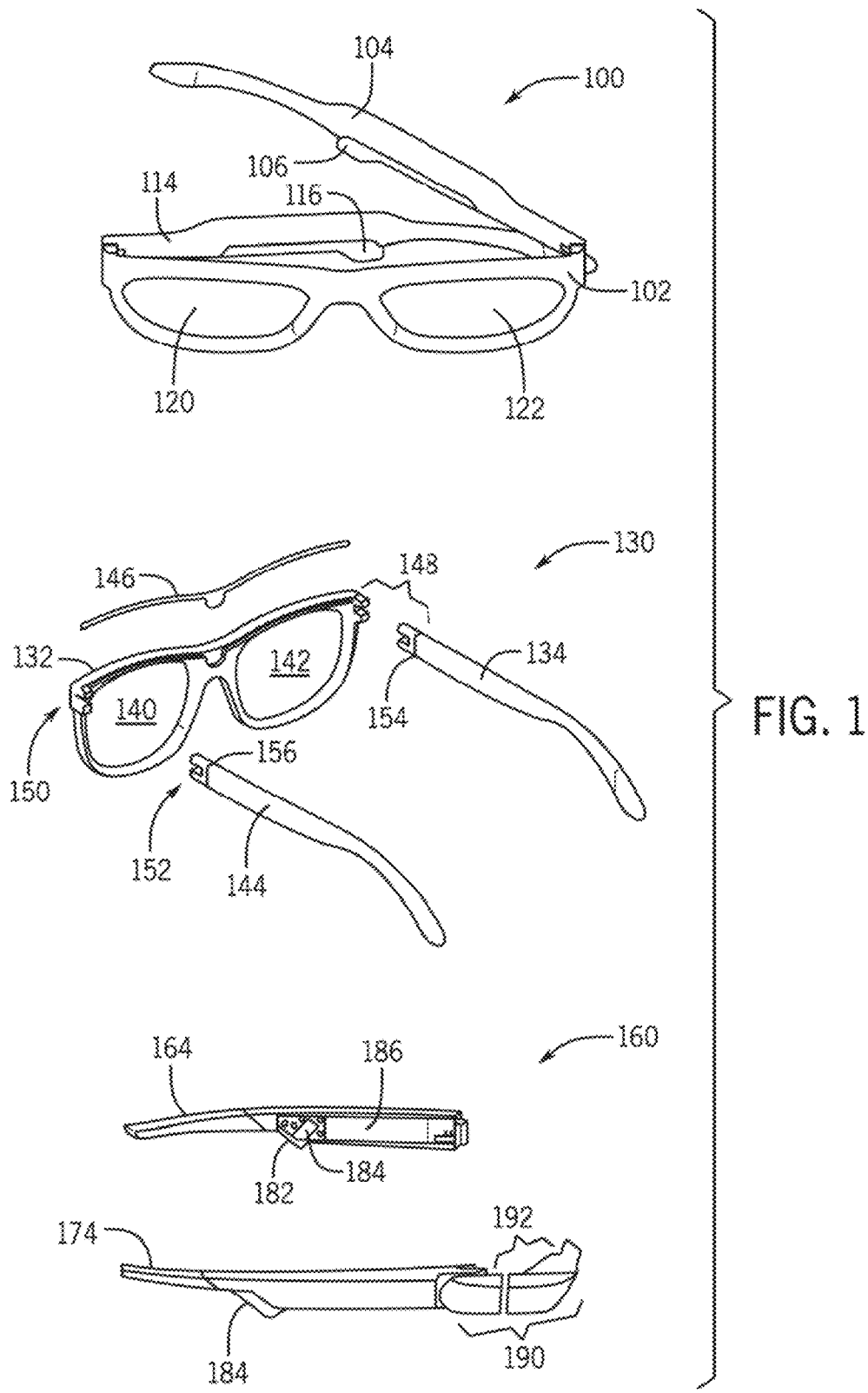
FIG. 1 illustrates a modular reconfigurable eyewear system, according to embodiments of the invention.

FIG. 1 illustrates a modular reconfigurable eyewear system, according to embodiments of the invention. With reference to FIG. 1, a modularized eyewear device is shown in perspective view at 100. The modularized eyewear device 100 has a frame chassis 102. In various embodiments, the frame chassis 102 is ophthalmically constructed to provide frame rim portions that hold lens 120 and lens 122. The lens 120 and 122 can provide any of the functions that eyewear devices provide, such as but not limited to, a safety glass lens, a prescriptive lens, a sunglass lens, a welding glass lens, etc. An eyewear device can also contain a single lens instead of the dual lens illustrated. In some embodiments, a nose pad is provided, thereby providing a cushion for the contact zone with a user's nose. In some embodiments, the nose pad is made from a compliant material such as silicon rubber.

A temple 104 (left temple) and a temple 114 (right temple) are coupled to the frame chassis 102. The temples 104 and 114 can be flexibly coupled to the frame chassis 102, with hinges as shown in the figure, or the temples 104 and 114 can be provided with a fixed orientation relative to the frame chassis 102.

In various embodiments, one or more temples (104 and 114) and the chassis frame 102 can be fitted with electronics as described below. Within the view of 100, a left temple inserts module (TIM) 106 is configured with the left temple 104 and a right temple insert module (TIM) 116 is configured with the right temple 114. Temple insert modules (TIMs) are described more fully in conjunction with the figures below.

With continued reference to FIG. 1, a modularized eyewear device is shown in exploded view at 130. A frame chassis 132 is ophthalmically constructed to encircle a lens 140 and a lens 142 with a frame rim thereby securing the lens 140 and the lens 142 thereto. A brow bar 146 is fastened to the frame chassis 132 in various ways, via assembly fasteners, adhesive, etc. A left temple 144 includes a left temple connector 152 which is rotatably couplable with a left chassis connector 150. Together, the left chassis connector 150 and the left temple connector 152 form a rotatable mechanical and electrical connection between the chassis 132 and the left temple 144, thereby providing one or more electrical pathways to connect the frame chassis 132 to the left temple 144. Similarly, a right temple 134 is rotatably couplable to the frame chassis 132 through a right hinge assembly 148.

Note that in some embodiments, a modularized eyewear device is configured such that each temple can be removed from its hinge via an electrical/mechanical connector having one or more electrical contacts, not shown for clarity in the illustration. These electrical contact points can be made using, for example, pins, points, pads, slots, contact devices, etc. For example, the line indicated at 154 demarcates the mating of the right temple connector with the right temple 134. Similarly, the line indicated at 156 demarcates the mating of the left temple connector 152 with the left temple 144.

Through the provision of electrical/mechanical connectors between each temple, e.g., 134, 144 and the frame chassis 132 the temples are interchangeable with the eyewear device. This functionality permits a user to interchange one temple with another. Different temples can be configured with different electronics to provide different functionality as described herein. Either temple can be configured to accommodate various electronics configurations. For example, in one or more embodiments, the right interchangeable temple accommodates an electronics package that can include one or more of; a biometric sensor, a biomechanical sensor, an environmental sensor, a temperature sensor, an acoustic sensor, a motion sensor, a light sensor, a touch sensor, a proximity sensor, a velocity sensor, an acceleration sensor, a rotation sensor, a magnetic field sensor, a global position system (GPS) receiver, cables, microphones, a micro speaker, a source of electrical power (battery), a camera, a micro display, a heads-up display (HUD) module, a multiaxis inertial measurement unit, a wireless communications system. Note that a TIM can also contain the electronics package and sensor(s) described above. In various embodiments, one or more wireless communication system are provided that utilize for example; near-field communications (NFC) using the industrial-scientific-medical (ISM) frequency of 13.56 MHz, the Adaptive Network Topology (ANT) ANT+ wireless standard, wireless communications using a Bluetooth standard, a Bluetooth low energy standard (BLE), wireless communication using a Wi-Fi standard, and wireless communication using mobile telephone standards such as for example the 3G, 4G, Long Term Evolution (LTE), 5G, etc. standard or other wireless standards. In some embodiments, electrical pathways from the electronics exit a temple via a sheath cavity and travel into a temple sheath and continue into a brow bar sheath cavity. The right interchangeable temple contains a hinge-connector 148 that fastens to the brow bar 146 and chassis frame 132.

In one or more embodiments, the right interchangeable temple attaches to the front of the frame chassis via a hinge-connector that allows for power and data transferred to the left interchangeable temple through the modular brow bar. The hinge-connector mechanically interlocks with the frame chassis and allows for power/data connectivity with electrical pin conductors. In one or more embodiments, when positioned in the open direction of wearing, the hinge-connectors sense the open state of the device allowing for power or data transfer. When in the closed position (temples folded inward), the hinge-connector in conjunction with signals received from one or more of proximity sensors and motion sensors will allow the system to sense the user-device interaction state and will deactivate the power or data transfer. Furthermore, in the open position, in some embodiments a sensor, such as, but not limited to, a proximity sensor, can detect when the device is being worn by a user and can thus operate in its active (ON) state. This function leads to reduced power consumption when folded and stowed and can lead to automatic power up while a user wears the device on his or her head. In addition to switchable data or power transfer from the hinge-connector, the hinge-connector can provide flexible circuits and wired microconnectors that provide steady uninterrupted power and or data transfer.

In some embodiments, it is convenient to route electrical pathways within a volume of the brow bar 146. In some embodiments, the brow bar 146 is constructed to provide a channel along its length, within which the electrical pathways are routed. Thus, the brow bar 146 provides one or more sheaths, channels, etc. along its length within which electrical pathways and sensors can be contained. Examples of electrical pathways are, but are not limited to; wires, printed circuit board, flexible printed circuit board, etc. In various embodiments, it is advantageous to mount one or more sensors to the brow bar 146, thereby making an electrical sub-assembly for the frame chassis 132. In some embodiments, additional electrical pathways from the frame chassis 132 are joined with the electrical pathway contained in the brow bar 146. In some embodiments, a flexible electronic circuit is adhered to the underside top face of the brow bar and exits the brow bar via the left and right sheath cavities. Alternatively, or in combination, fully embedded flexible electronics may be cast into the brow bar with integrated contact points exiting the brow bar near each hinge. These integrated contact points on both sides of the brow bar allow transmission of data or power when in contact with the integrated contact points of the right and left temple. In addition to facilitating connection to electronics, the brow bar can conceal an optional pupil module by a securing flange and allows the user to view a micro display via the brow bar pupil aperture.

In similar fashion the left temple is configured as a left interchangeable temple connected to the front frame of the eyewear with a left hinge-connector. In various embodiments, the left interchangeable temple can contain the same electronics configuration/functionality as the right interchangeable temple or interchangeable temples can contain different electronics configurations and different functionality.

With continued reference to FIG. 1, a left temple 164 and right temple 174 are configured as shown at 160. Each of the temples 164 and 174 contain electronics which are configured to provide information and functionality to a user of the eyewear system. As shown at 160, the left temple 164 has a temple door (not shown) removed thereby exposing an electronics package indicated at 186. The temple door secures and protects electronics from environmental exposure and hazard. The temple door is secured to the temple assembly with suitable mechanical fasteners for a given application. In some embodiments, the temple door provides a rating with respect to water intrusion via an IP Code from International Protection Marking IEC standard 60529. A source of electrical power (battery) is illustrated at 184 and an audio speaker and port are illustrated at 182. The audio speaker and port 182 is generally located on a posterior end of a temple and in some embodiments is an integrated directional projection speaker that privately directs sound to a user's ear. Projection stereo speakers can communicate various audio signals to the user, such as but not limited to, voice prompts, streaming music, smart audio assistance, data, etc. Notably, the projection speaker design does not occlude the user's ear. Thus, the user can hear far field sounds and the far field sounds are not degraded as they are with currently available earbud style headphones that occlude a user's ear.

The right temple 174 is also provided with an electronics package (not shown in the view) contained within the right temple 174. The right temple is provided with an audio speaker with audio speaker port 184, which can be an integrated directional projection speaker. In one or more embodiments, the right temple 174 is configured to accommodate an external assembly 190 that contains a micro display assembly 192. Similarly, the left temple could be configured for the external assembly 190 and the micro display assembly 192.

In various embodiments, a micro display assembly, such as 192, is a head up display (HUD) Pupil™ Optics Module that houses the optics, electronics, and micro display that form the optical system. The pupil mechanism also may house cables, flexible circuit boards, or wires which exit from a housing into an electronics contact pathway. In one or more embodiments, these electrical pathways are connected to a side of the left temple 174 to enable the user with a see-through head up display external accessory to enhance a visual component of a mobile assisted and/or augmented reality experience.

In one or more embodiments, wiring which exits the brow bar is concealed in the right and left sheaths of the temples and enters into the right and left temples via the sheath cavities, thereby protecting the wiring from environmental hazards. The area near the contact pathway may also accommodate motion mechanisms for customizing the interpupillary distance of the head-up micro display module.

In different embodiments, the front frame portion, such as 102 or 132 (FIG. 1) or any similar structure in the figures below, and the right and left temple portions, such as 104, 114, 134, 144, 164, 174 (FIG. 1) or any similar structures in the figures below, can be part of a set of interchangeable front frame portions and temple portions each having the same or different combinations of devices, accessories, capabilities and/or functions. At least one of an electronics board, microphones, speakers, battery, camera, heads-up display module, wireless Wi-Fi radio, GPS chipset, LTE cellular radio, multiaxis inertial measurement unit, motion sensor, touch sensor, light and proximity sensors, etc. can be included in desired combinations. Electronics can be further included that permit a user to perform at least one of; wirelessly connecting to a cellular service, a smart phone, a smart watch, a smart bracelet, a mobile computer, and a sensor peripheral. The electronics can further include the ability to; view see-through augmented reality images via a modular head up display (HUD), provide stereo audio content, provide voice and audio notification including music through one or more integrated projection microspeakers. The front frame electrical contact devices and the temple electrical contact devices can include electrical contact points in or near respective hinge connectors for removable electrical contact with each other for electrically transmitting at least one of; power, electrical signals and data between the temple portions and the front frame portion when the contact points are in an electrically closed position. In some embodiments when assembled together, the front frame hinge connectors, the front frame electrical contact devices, the temple hinge connectors and the temple electrical contact devices can form electromechanical hinges, hinge connectors, assemblies or devices. In some embodiments, system electrical power can be turned off by folding the temple portions into a storage position thereby disconnecting the contact points.

In some embodiments, at least one of the front frame electronics and the temple electronics can include at least one of a battery, camera, heads-up display module, controller, digital storage electronics, CPU, projection microspeaker, microphone, wireless Wi-Fi radio, GPS chipset, LTE cellular radio, multiaxis inertial measurement system or unit, and sensory, motion, touch, light, proximity, temperature and pressure sensors, etc.

In some embodiments, at least one temple can include a temple module insert (TIM) containing selected temple electronics, mounted thereto. In other embodiments, a neck smart cord is electrically connected to a behind the neck electronics module. The neck smart cord has right, and left connectors or connector ends for mechanically and or electrically interconnecting the behind the neck electronics module with the right and left temples of an eyewear device.

Figure 2:
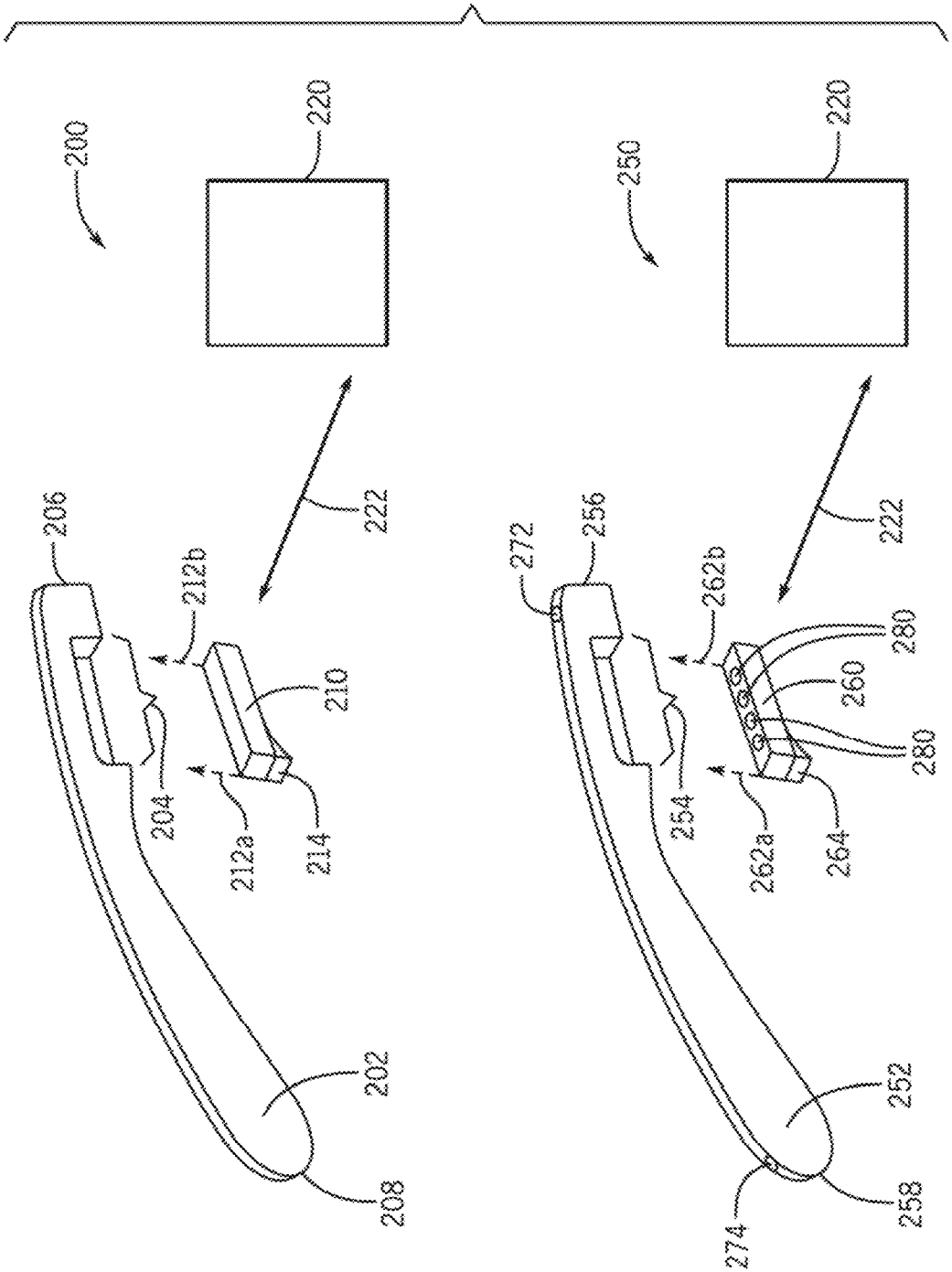
FIG. 2 illustrates a reconfigurable component for an eyewear device, according to embodiments of the invention.

FIG. 2 illustrates a reconfigurable component for an eyewear device, according to embodiments of the invention. With reference to FIG. 2 at 200, a temple 202 is provided with an engagement portion 204. A temple insert module, referred to in this description of embodiments as a "TIM" at 210 is configured to be releasably couplable with the engagement portion 204 of the temple 202. The TIM 210 is installed into the temple 202 as indicated by arrows 212a and 212b. In various embodiments, the engagement portion 204 is accomplished by a mechanical connection, such as but not limited to; press fit, clip, mechanical interlock, hook and loop, magnetic surface, external clamp to temple, flange and mechanical coupling to temple, etc. In yet other embodiments the engagement portion 204 and the TIM 210 utilize magnetic surfaces, thereby holding the TIM 210 secure by magnetic attraction. The form of the engagement portion shown at 204, as well as the form of any engagement portion illustrated elsewhere in the figures presented herein, is given merely for illustration and does not limit embodiments of the invention. In the view illustrated at 200, the TIM 210 only makes a mechanical connection with the temple 202 no electrical connection is provided between the TIM 210 and the temple 202.

In some embodiments, the TIM 210 is provided with a speaker and speaker port 214, which can be a micro projection speaker. The speaker provides information to a user through a directed audio broadcast. Note that the speakers provided herein are speakers that are located externally from a user's ear and are therefore not inserted into the user's ear like an earbud is inserted. The TIM 210 is configured with an electronics package that contains a processor, memory, electrical power, and one or more wireless communication protocols that enable the TIM 210 to communicate wirelessly 222 with one or more devices 220. The device 220 can be an external sensor such as, but not limited to; a biometric sensor or a vehicle sensor, a local user device, a network node, such as a wireless router, a remote network, or a remote user device such as a mobile phone accessed through a network. Different sensors, networks, and remote devices are described more fully in conjunction with the figures below.

Following the architecture of FIG. 2 at 200, in some embodiments, a second temple and a second TIM are provided. The two TIMs in such a system can engage in wireless communication between the device 220 and between themselves as needed to provide a level of design functionality to a user. For example, in one embodiment, a left TIM includes wireless network capability sufficient to communicate with the remote device 220, utilizing a first network protocol. In addition, the left TIM and the right TIM are provided with wireless network capability that supports communication utilizing a second network protocol. In order to conserve electrical power, the first network protocol has a greater range than the second network protocol because a distance between the left TIM and the remote device is greater than a separation distance between the left TIM and the right TIM (nominally a width of user's head). The architecture illustrated at 200 is referred to as true wireless because there is no wired connection between the left TIM and the right TIM. In one or more embodiments, an audio stream is provided from a user device to a first TIM utilizing a first wireless network. Then a second wireless audio stream is provided from one TIM to the other TIM utilizing a second wireless network in order to provide the audio stream to each of a left and a right projection speakers of the eyewear device.

The temples and TIMs described at 200 provide reconfigurable components for eyewear devices as described in conjunction with the figures herein. A forward end 206 of the temple 202 is engageable with a frame chassis of an eyewear device as described above with or without a connector between a temple and a frame. Thus, the temple 202 can attain a fixed position relative to a frame chassis or the temple can be rotatably coupled to the frame chassis depending on a given design of the eyewear.

With reference to FIG. 2 at 250, a temple 252 is provided with an engagement portion 254. A temple insert module, TIM at 260, is configured to be releasably couplable with the engagement portion 254 of the temple 252. The TIM 260 is installed into the temple 252 as indicated by arrows 262a and 262b. In various embodiments, the engagement portion 204 is accomplished by a combined electrical and mechanical connection. The mechanical connection can be as described in conjunction with 210/204 such as, but not limited to; press fit, clip, mechanical interlock, hook and loop, etc. In yet other embodiments the engagement portion 254 and the TIM 260 utilize magnetic surfaces, thereby holding the TIM 260 secure by magnetic attraction. A number of electrical contacts 280 are provided for illustration with no limitation implied thereby. The electrical contacts 280 mate with corresponding electrical contacts in the temple 252 thereby providing electrical connection to one or more electrical pathways (not shown) in the temple 252. The electrical pathways within the temple 252 facilitate electrical connection between the TIM 260 and one or more sensors 272 and 274, which can also represent a source of signals provided to a display(s). The sensors 272 and 274 can be acoustic sensors such as microphones or any of the sensors described herein for use in conjunction with electronics packages configured with eyewear devices. In one or more embodiments, one or more of 272 and 274 provide signals to a display such as a HUD.

In some embodiments, the TIM 260 is provided with a speaker and speaker port 264, which can be a micro projection speaker. The speaker provides information to a user through an open-ear audio broadcast.

Following the architecture of FIG. 2 at 250, in some embodiments, a second temple and a second TIM are provided, as shown below in FIG. 3. The two TIMs in such a system engage in wireless communication between the device 220 and between themselves as needed to provide a level of design functionality to a user. The temples and TIMs described at 250 provide reconfigurable components for eyewear devices as described in conjunction with the figures herein. For example, a forward end 256 of the temple 252 is engageable with a frame chassis of an eyewear device as described above with or without a connector between a temple and a frame. Thus, the temple 252 can attain a fixed position relative to a frame chassis or the temple can be rotatably coupled to the frame chassis depending on a given design of the eyewear.

Figure 3:
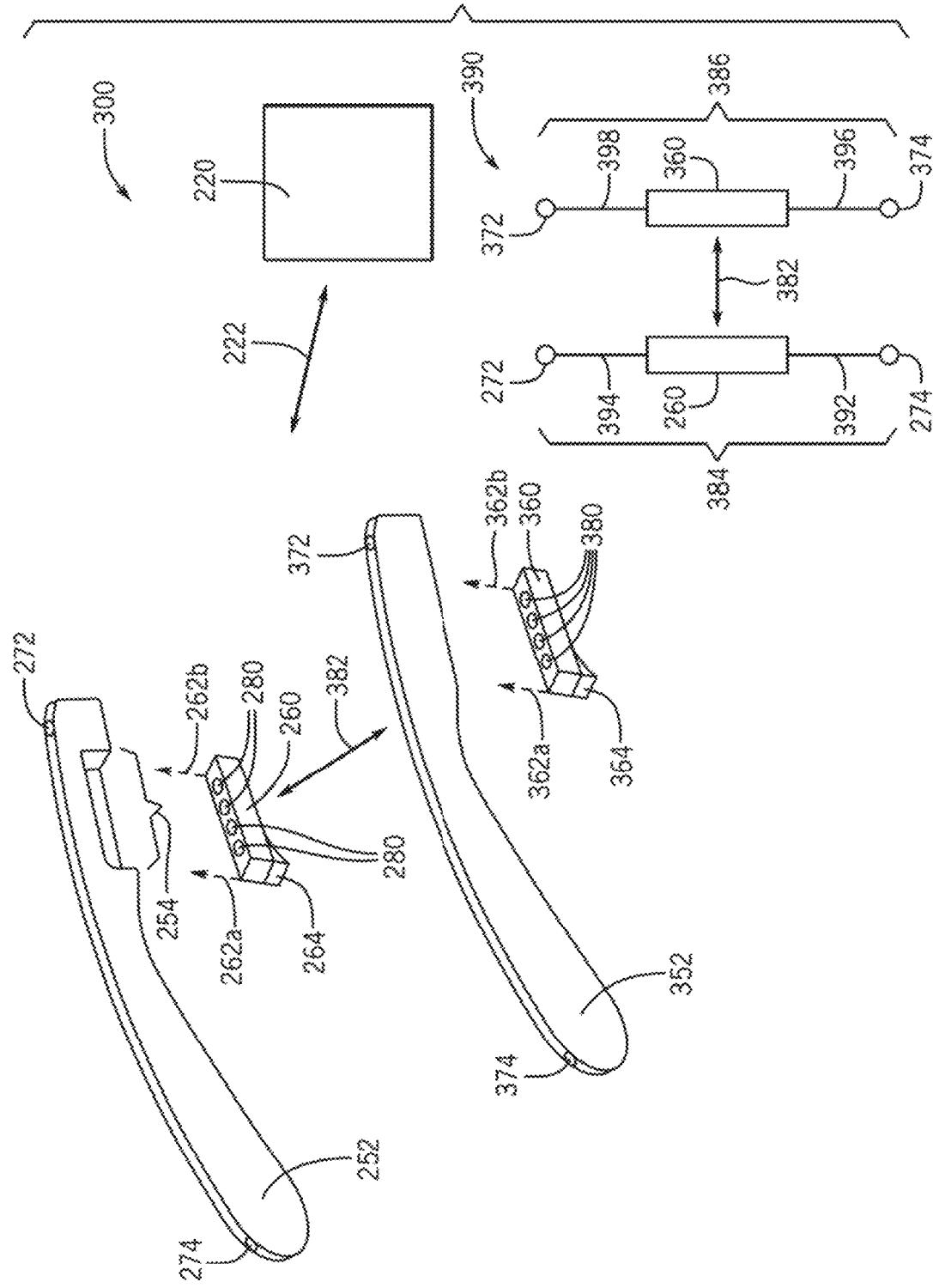
FIG. 3 illustrates multiple reconfigurable components for an eyewear device, according to embodiments of the invention.

FIG. 3 illustrates, at 300, multiple reconfigurable components for an eyewear device, according to embodiments of the invention. With reference to FIG. 3 at 300, the left reconfigurable component 250 from FIG. 2 is illustrated with a companion right reconfigurable component for an eyewear device. A right temple 352 has an engagement portion that is not shown in FIG. 3 but is similar to the engagement portion 254 of the left temple 252. A temple insert module, TIM at 360 is configured to be releasably couplable with the engagement portion of the temple 352. The TIM 360 is coupled with the temple 352 as indicated by arrows 362a and 362b. In various embodiments, the engagement portion of the temple 352 is accomplished by a combined electrical and mechanical connection. The mechanical connection can be provided as described above in conjunction with 210/204 such as, but not limited to; press fit, clip, mechanical interlock, hook and loop, etc. In yet other embodiments the engagement portion of the temple 352 and the TIM 360 utilize magnetic surfaces, thereby holding the TIM 360 secure by magnetic attraction. Several electrical contacts 380 are provided for illustration with no limitation implied thereby. The electrical contacts 380 mate with corresponding electrical contacts in the temple 352 thereby providing electrical connection to one or more electrical pathways (not shown) in the temple 352. The electrical pathways within the temple 352 facilitate electrical connection between the TIM 360 and one or more sensors 372 and 374. The sensors 372 and 374 can be acoustic sensors such as microphones or any of the sensors or displays described herein for use in conjunction with electronics packages configured with eyewear devices. In various embodiments, the TIM 360 is configured with an electronics package that contains a processor, memory, electrical power, and one or more wireless communication systems using protocols that enable the TIM 360 to communicate wirelessly as indicated by a wireless transmission at 222 with one or more devices 220. In addition, the TIM 360 and the TIM 260 can be configured with wireless communication capability that permits wireless communication between the TIMs as indicated by a wireless transmission at 382. In some embodiments, the TIM 360 is provided with a speaker and a speaker port indicated at 364, which can be a micro projection speaker. The speaker provides information to a user through an audio broadcast.

With reference to view 390 of FIG. 3, electrical connectivity schematics are illustrated for each of TIM 260 and TIM 360. The TIM 260 is electrically coupled to the sensor 272 with an electrical pathway 394. Similarly, the TIM 260 is electrically coupled to the sensor 274 by an electrical pathway 392. The connectivity illustrated between the TIM 260 and the respective sensors constitutes a left temple electrical schematic 384. Note that the left temple electrical schematic 384 can be more complex or less complex that the illustration. Thus, the left temple electrical schematic is provided merely for illustration with no limitation implied thereby.

Similarly, the TIM 360 is electrically coupled to the sensor 372 with an electrical pathway 398. The TIM 360 is electrically coupled to the sensor 374 by an electrical pathway 396. The connectivity illustrated between the TIM 360 and the respective sensors constitutes a right temple electrical schematic 386. Note that the right temple electrical schematic 386 can be more complex or less complex that the illustration. Thus, the right electrical schematic is provided merely for illustration with no limitation implied thereby.

The two TIMs in such a system engage in wireless communication between the device 220 and between themselves as needed to provide a level of design functionality to a user. For example, in one embodiment, a left TIM includes wireless network capability sufficient to communicate with the remote device 220, utilizing a first network protocol. In addition, the left TIM and the right TIM are provided with wireless network capability that supports wireless communication as indicated at 382. The wireless communication 382 can be performed with a second network protocol, which is different from that used at 222. In order to conserve electrical power, the first network protocol (222) has a greater range than the second network protocol (382) because a separation distance between the left TIM 260 and the remote device 220 is greater than a separation distance between the left TIM 260 and the right TIM 360, the latter is nominally a width of user's head, and the former can be as much as a distance to a mobile telephone cellular tower.

Figure 4:
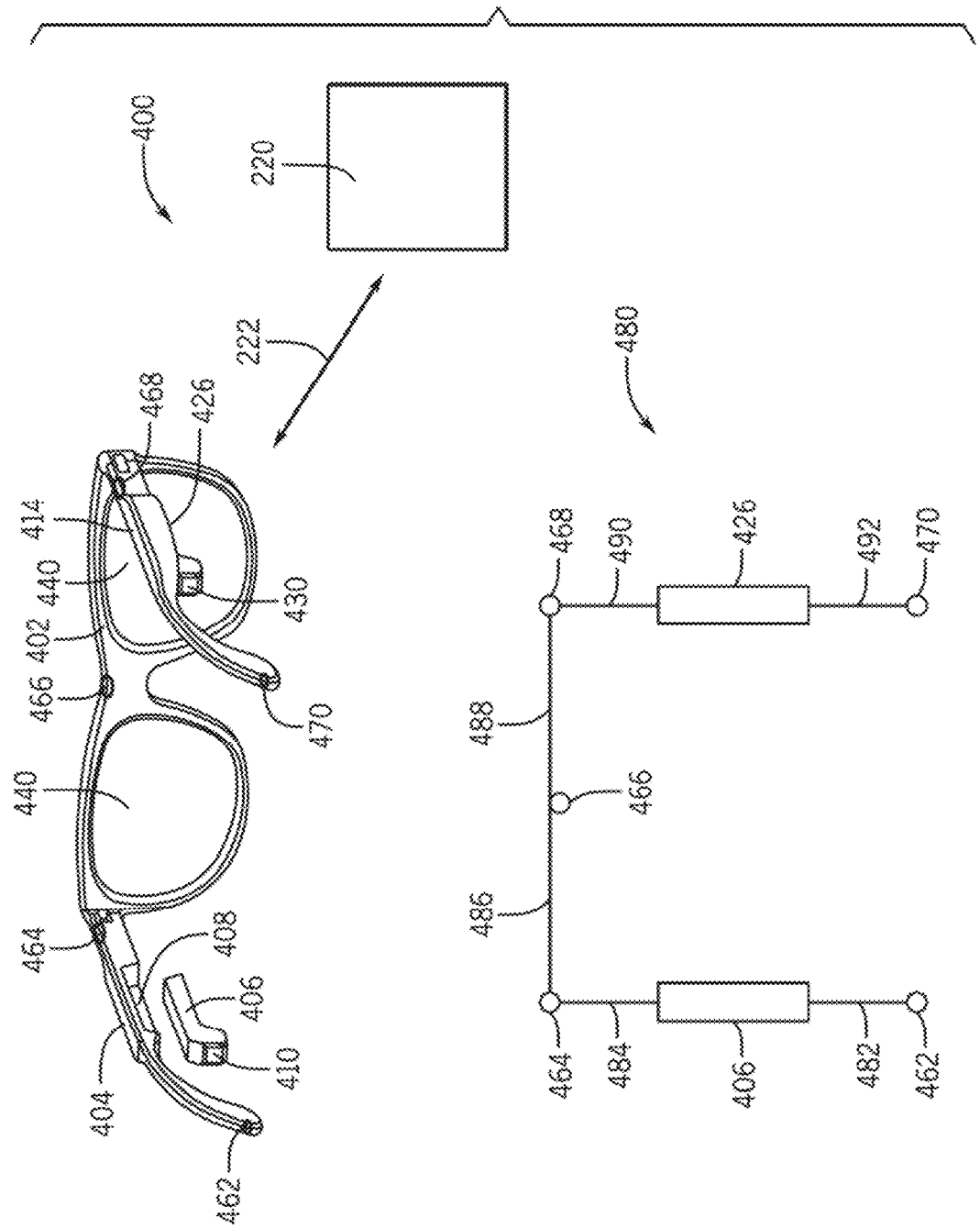
FIG. 4 illustrates another reconfigurable modularized eyewear system, according to embodiments of the invention.

FIG. 4 illustrates another reconfigurable modularized eyewear system, according to embodiments of the invention. With reference to FIG. 4, one or more of sensors, power components, and computational units are distributed throughout an eyewear device, including distributed throughout a frame chassis such as 402. A frame chassis 402 is ophthalmically constructed to encircle lens 440 with frame rims thereby securing the lens 440 thereto. A left temple 404 are a right temple 414 are coupled to the frame chassis 402, thereby forming an eyewear device. The left temple 404 is configured with an engagement portion indicated at 408. A left temple inserts module (TIM) 406 is configured as described above to engage with the engagement portion 408, thereby providing both mechanical and electrical connection between the TIM 406 and the temple 404. Similarly, a right temple 426 is illustrated as engaged with the engagement portion of the right temple 414. The TIM 406 contains an audio speaker and audio port indicated at 410 and the TIM 426 contains an audio speaker and audio port indicated at 430. In various embodiments, the audio speakers of 410 and 430 are projection speakers. The eyewear device includes several sensors or display(s), 462, 464, 466, 468, and 470 that are integrated into an electrical pathway that extends from the left temple 404 through the frame chassis 402 to the right temple 414. In various embodiments there can be more sensors or less sensors that those shown in FIG. 4. The sensors and the locations of the sensors shown in FIG. 4 are provided merely as an illustration and do not limit embodiments of the invention. As described above in conjunction with the previous figures, at least one of the temple insert modules, 406 and or 426, are provided with a suite of electronics necessary to provide wireless connectivity 222 to a device 220.

In the eyewear device of 400, a high-level view of an electrical pathway schematic is shown at 480. With reference to 480, the left TIM 406 and the right TIM 426 are electrically coupled with sensors 462, 464, 466, 468, and 470 by electrical pathway elements 482, 484, 486, 488, 490, and 492. An electrical pathway element, such as 484, electrically connects the sensor 464. Together, the components shown in 480 provide a modularized reconfigurable set of components for an eyewear device. In one or more embodiments, one or more acoustic sensors are located in at least one of, the frame chassis 402, the left temple 404, and the right temple 414. Thus, acoustic sensors can be located anywhere on a temple (left or right) or a frame chassis of the eyewear device.

Figure 5:
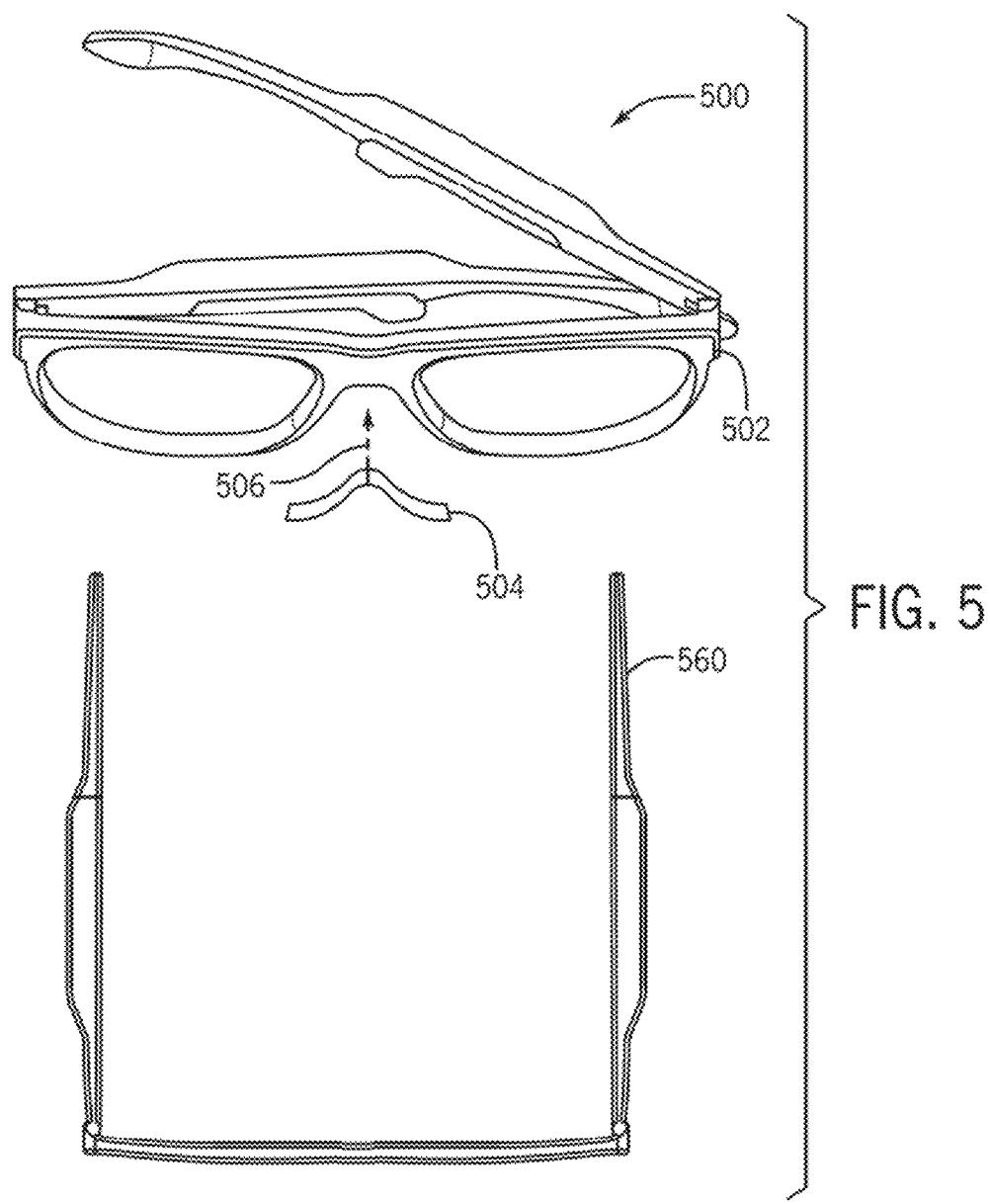
FIG. 5 illustrates a perspective view and a top view of the modularized eyewear system from FIG. 4, according to embodiments of the invention.

FIG. 5 illustrates, generally at 500, a perspective view and a top view of the modularized eyewear system from FIG. 4, according to embodiments of the invention. With reference to FIG. 5, a modularized eyewear device is illustrated in perspective view at 502. A modularized nose pad 504 is releasably couplable as indicated at 506 with the modularized eyewear device 502. Modularization of nose pads permits a user to swap nose pads in order to improve the fit between the eyewear and the user's nose and facial structure. A greater level of comfort can be achieved through modularization of the nose pad of the eyewear device. In addition, other sensors such as a biometric sensor can be provided in the nose pad.

Figure 6A:
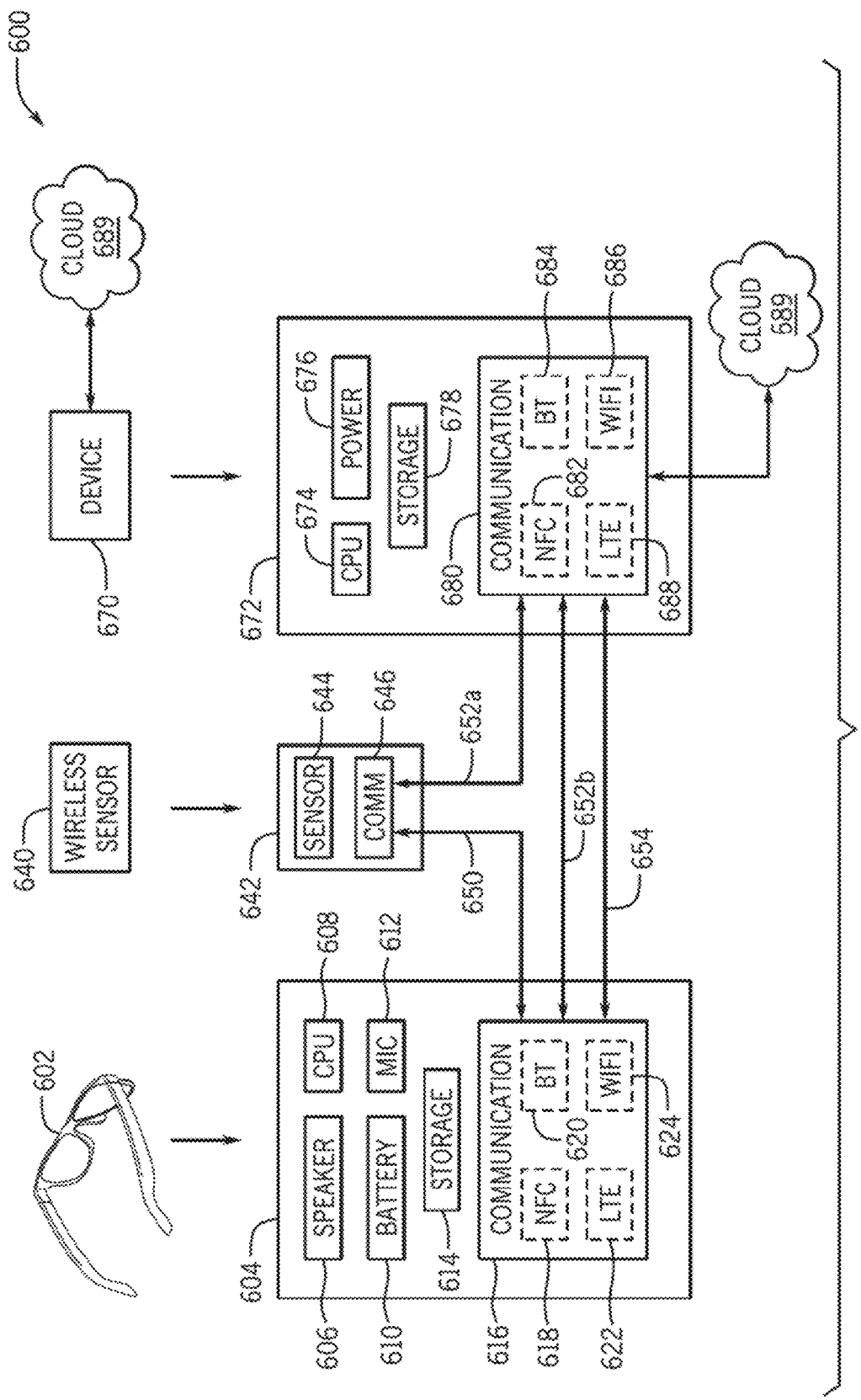
FIG. 6A illustrates a system architecture for a modularized eyewear device, according to embodiments of the invention.

FIG. 6A illustrates, generally at 600, a system architecture for a modularized eyewear device, according to embodiments of the invention. With reference to FIG. 6A, in various embodiments, a modularized reconfigurable eyewear device can contain more than one wireless communication system. In various embodiments, an eyewear device 602 has a high-level block diagram architecture as shown at 604. In various embodiments, the eyewear device 602 is configured to communicate with a wireless sensor 640 and a mobile device 670. The wireless sensor 640 can contain a single sensor or a plurality of sensors. The wireless sensor 640 can contain any one or more of the sensors listed herein without limitation. For example, the wireless sensor 640 can include a biometric sensor or biomechanical sensor configured for use with a user or a sensor configured for use with a vehicle or building. Some examples of biometric sensors are, but are not limited to; a heart rate monitor, a perspiration sensor, a temperature sensor, etc. Some examples of vehicle sensors are, but are not limited to; a velocity sensor, an acceleration sensor, a global position system signal, a vehicle engine parameter, a wind speed indicator, etc. Some examples of sensors for use with a building are, but are not limited to; a temperature reading from a thermostat, a water pressure value, etc. Some non-limiting examples of vehicles are, but are not limited to; a scooter, bicycle, an automobile, a boat, a yacht, a watercraft, an airplane, a military vehicle, a wing suit, etc. In some embodiments, data is received at 640 and or 616 from a special use network. An example of a special use network, given for illustration with no imitation implied thereby, is a National Marine Electronics Association (NMEA) NMEA 2000 network designed for watercraft such as yachts (power or sail). NMEA 2000, also referred to in the art as "NMEA2k" or "N2K" is standardized as International Electrotechnical Commission (IEC) 61162-1. NMEA 200 is a plug-and-play communications standard used for connecting marine sensors and display units within ships, boats, yachts, etc. The mobile device 670 can be any one or more of the mobile devices listed herein without limitation. For example, the mobile device can be a mobile phone, a watch, a wrist band, a bracelet, a tablet computer, a laptop computer, a desktop computer, a vehicle computer, etc.

The eyewear device 602 has a high-level architecture, represented at 604, that contains a speaker 606, a central processing unit 608, a source of electrical power 610, an acoustic sensor 608, a storage device 614, and a wireless communication system 616. Wireless communication system 616 can contain one or more of the following wireless communication systems, e.g., a near-field communication system 618, a wireless communication system utilizing the Bluetooth communication protocol 620, a wireless communication system utilizing the Wi-Fi communication protocol at 624, a mobile telephone communications protocol 622. The wireless communication protocol designated by LTE at 622 is given merely as an example for wireless devices and does not limit embodiments of the invention. Those of skill in the art will recognize that one or more antennas are included, but not shown for clarity, in the wireless communication system block 616.

The wireless sensor 640 has a high-level architecture, represented at 642, that includes one or more sensors 644 and a wireless communication system 646. The wireless communications system 646 can be a low data rate communications system such as a near-field communications system, BLE, ANT+, or the like. Or the wireless communication system 646 can be provided as a higher data rate system as required by the sensor(s) 644.

The mobile device 670 has a high-level architecture, represented at 672, that includes, a central processing unit 674, a source of electrical power 676, storage 678, and one or more wireless communication systems indicated at the block 680. The mobile device 670 can be optionally configured to reach remote networks as indicated by cloud 689. The wireless communication block 680 can include one or more of the following wireless communication systems, e.g., a near-field communication system 682, a wireless communication system utilizing the Bluetooth communication protocol 684, a wireless communication system utilizing the Wi-Fi communication protocol at 686, and a mobile telephone communications protocol at 688. The wireless communication protocol designated by LTE at 688 is given merely as an example of a communication system for mobile devices and does not limit embodiments of the invention. Those of skill in the art will recognize that one or more antennas are included, but not shown for clarity, in the wireless communication system block 680 and 642.

In some embodiments, the wireless sensor system 642 and the eyewear device 602 are configured initially by a user of the mobile device 670 and the mobile device user interface as indicated by pathways 652*a* and 652*b*. In operation, the eyewear device 602 receives data wirelessly as indicated at 650 from a suitable wireless communication system, such as for example a near-field communications system 618. Wireless data obtained from the wireless sensor system 642 can be transmitted to the user device 670/672 by another wireless communication system such as indicated at 654. The wireless communication indicated at 654 can be accomplished with a higher data rate channel using for example Bluetooth protocol at 620/684, or Wi-Fi protocols at 624/686, or mobile phone communications protocol indicated at 622/688. Data transferred from the eyewear device 602 can be stored and analyzed on the user device 670 in various embodiments and with different application programs.

Figure 6B:
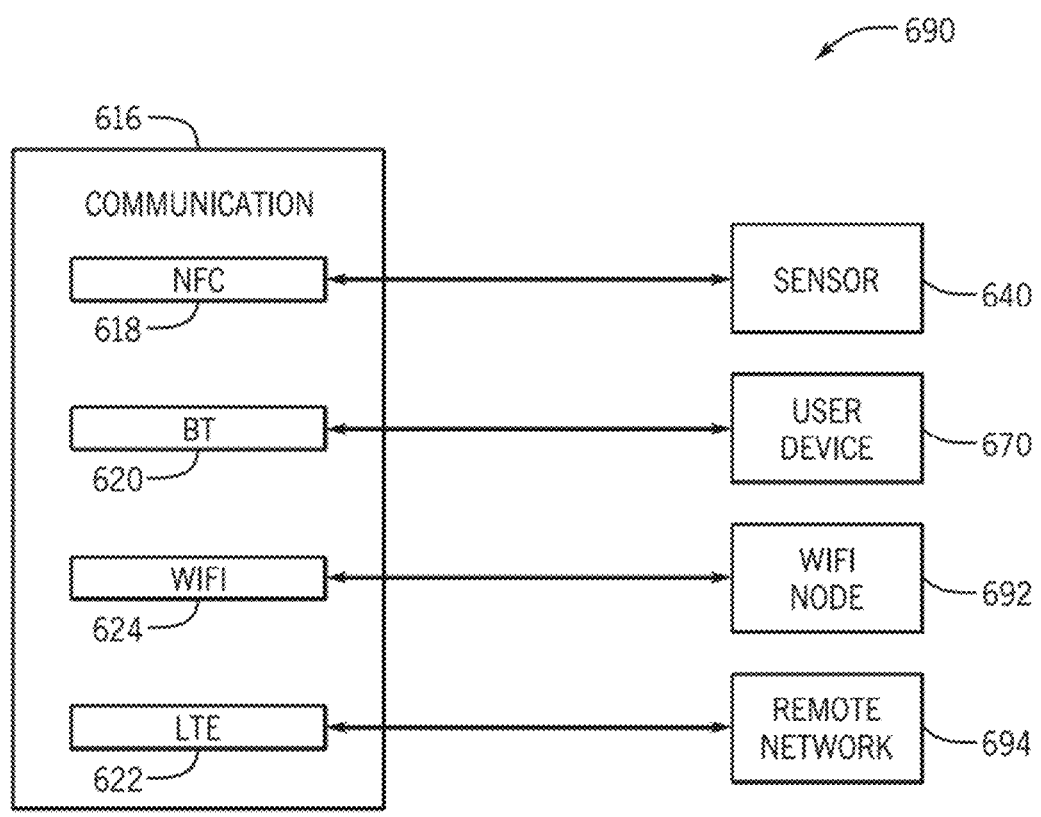
FIG. 6B illustrates wireless networks corresponding to the system architecture for the modularized eyewear device of FIG. 6A, according to embodiments of the invention.

FIG. 6B illustrates, generally at 690, wireless networks corresponding to the system architecture for the modularized eyewear device of FIG. 6A, according to embodiments of the invention. With reference to FIG. 6B, the wireless communication block 616 can connect to a plurality of devices as shown in the figure. For example, one or more wireless sensors 640 can connect to the wireless communication block 616 utilizing low data rate near-field communication networks as indicated at 618. One or more user devices 670 can communicate wirelessly with the wireless communication block using Bluetooth communication protocols as indicated at 620. One or more wireless nodes, such as Wi-Fi nodes indicated at 692 can communicate wirelessly with the wireless communication block 616 as indicated at 624. One or more remote networks 694 can communicate wirelessly with the wireless communication block 616 using cellular communication protocols as indicated at 622. Thus, a reconfigurable eyewear device can contain one or more of the wireless communication systems shown in the illustration at 690. An eyewear device can be reconfigured for different wireless communication by swapping for example one TIM module for another. Alternatively, one or more temples can be swapped with a frame chassis as described above to provide customized functionality to an eyewear device.

Figure 7:
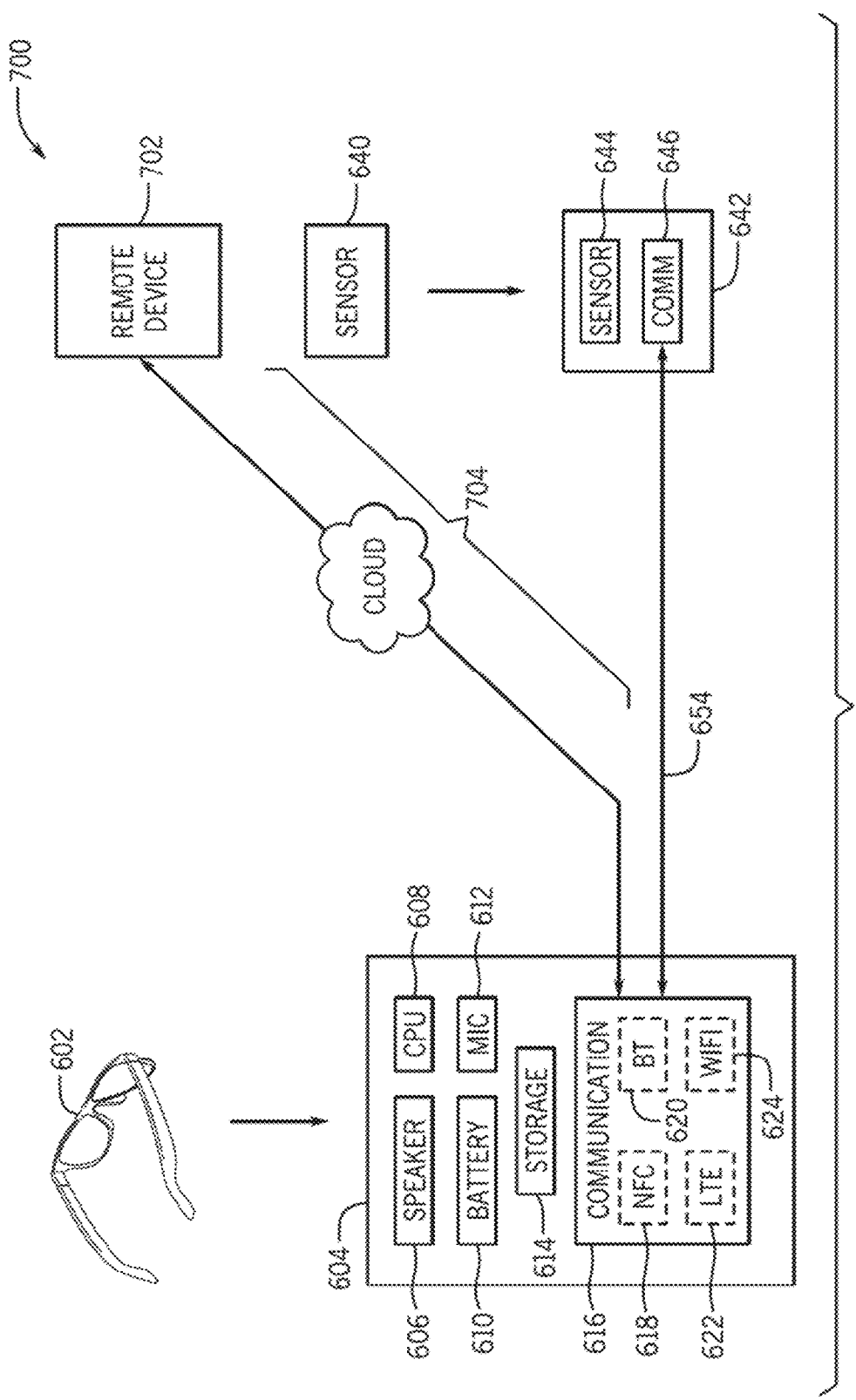
FIG. 7 illustrates another system architecture for the modularized eyewear device of FIG. 4, according to embodiments of the invention.

FIG. 7 illustrates, generally at 700, another system architecture for the modularized eyewear device of FIG. 4, according to embodiments of the invention. With reference to FIG. 7, the wireless communication block 616 of the eyewear device 602 can be configured for cellular communications via mobile telephone networks directly without needing a user device to function as an intermediary. For example, in 700, the eyewear device 602 is configured for communication with a remote device 702, which can be a mobile telephone, by a wireless communication system 622 thereby connecting with the remote device 702 directly through the external networks indicated by cloud 704. No intermediary user mobile device is needed to support this line of communication. Such a configuration of an eyewear device allows a user of the eyewear device to make telephone calls from the eyewear device with the assistance of an interface, such as a voice interface, one or more tactile interface like buttons, etc. The voice interface provides command and control of the telephone call by converting the user's voice signals to commands that the device uses to facilitate the operation of the wireless network for the telephone call. Examples of such commands are, but are not limited to; select caller, place call, volume up, volume down, end call, etc.

Figure 8:
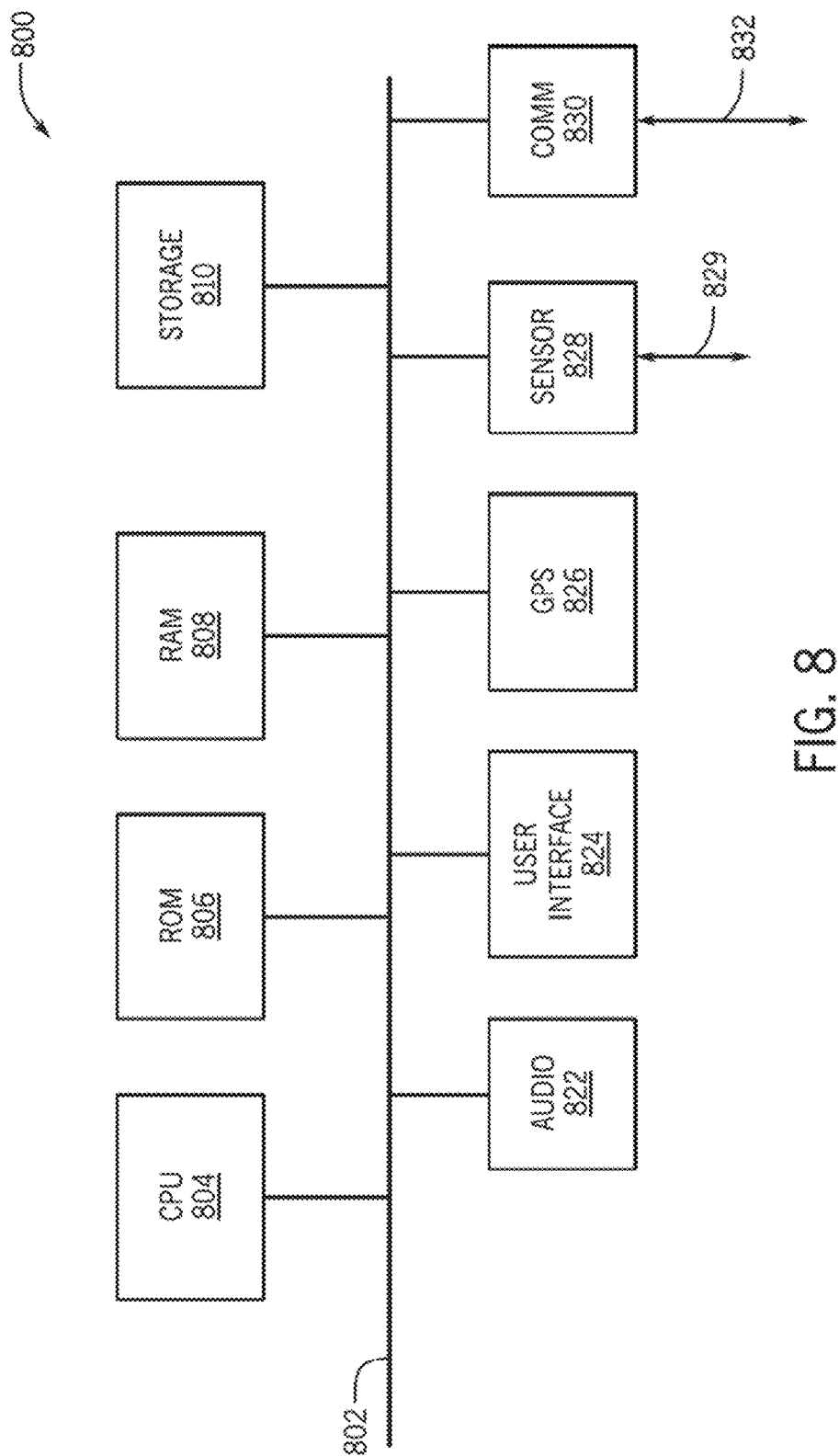
FIG. 8 illustrates a block diagram of a temple insert module, according to embodiments of the invention.

FIG. 8 illustrates, generally at 800, a block diagram of a temple inserts module (TIM), according to embodiments of the invention. With reference to FIG. 8, as used in this description of embodiments, a TIM can be based on a device such as a computer, in which embodiments of the invention may be used. The block diagram is a high-level conceptual representation and may be implemented in a variety of ways and by various architectures. Bus system 802 interconnects a Central Processing Unit (CPU) 804 (alternatively referred to herein as a processor), Read Only Memory (ROM) 806, Random Access Memory (RAM) 808, storage 810, audio 822, user interface 824, and communications 830. RAM 808 can also represent dynamic random-access memory (DRAM) or other forms of memory. The user interface 824 can be in various embodiments a voice interface, a touch interface, a physical button, or combinations thereof. It is understood that memory (not shown) can be included with the CPU block 804. The bus system 802 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 994 (FireWire), Universal Serial Bus (USB), universal asynchronous receiver-transmitter (UART), serial peripheral interface (SPI), inter-integrated circuit (I2C), etc. The CPU 804 may be a single, multiple, or even a distributed computing resource. Storage 810 may be flash memory, etc. Note that depending upon the actual implementation of a TIM, the TIM may include some, all, more, or a rearrangement of components in the block diagram. Thus, many variations on the system of FIG. 8 are possible.

Connection with one or more wireless networks 832 is obtained via communication (COMM) 830, which enables the TIM 800 to communicate wirelessly with local sensors, local devices, as well as with remote devices on remote networks. In some embodiments, 832/830 provide access to remote voice-to-text conversion systems which can be in remote locations, for example cloud based. 832 and 830 flexibly represent wireless communication systems in various implementations, and can represent various forms of telemetry, general packet radio service (GPRS), Ethernet, Wide Area Network (WAN), Local Area Network (LAN), Internet connection, Wi-Fi, WiMAX, ZigBee, Infrared, Bluetooth, near-field communications, mobile telephone communications systems, such as 3G, 4G, LTE, 5G, etc. and combinations thereof. In various embodiments, a touch interface is optionally provided at 824. Signals from one or more sensors are input to the system via 829 and 828. Global position system (GPS) information is received and is input to the system at 826. Audio can represent a speaker such as a projection speaker or projection micro-speaker described herein.

In various embodiments, depending on the hardware configuration, different wireless protocols are used in the networks to provide the systems described in the figures above. One non-limiting embodiment of a technology used for wireless signal transmission is the Bluetooth wireless technology standard which is also commonly known as IEEE 802.15.1 standard. In other embodiments, the wireless signal transmission protocol known as Wi-Fi is used which uses the IEEE 802.11 standard. In other embodiments, the ZigBee communication protocol is used which is based on the IEEE 802.15.4 standard. These examples are given merely for illustration and do not limit different embodiments. Transmission Control Protocol (TCP) and Internet Protocol (IP) are also used with different embodiments. Embodiments are not limited by the data communication protocols listed herein and are readily used with other data communication protocols not specifically listed herein.

In various embodiments, the components of systems as well as the systems described in the previous figures (such as a temple insert module (TIM)) are implemented in an integrated circuit device, which may include an integrated circuit package containing the integrated circuit. In some embodiments, the components of systems as well as the systems are implemented in a single integrated circuit die. In other embodiments, the components of systems as well as the systems are implemented in more than one integrated circuit die of an integrated circuit device which may include a multi-chip package containing the integrated circuit.

Figure 9:
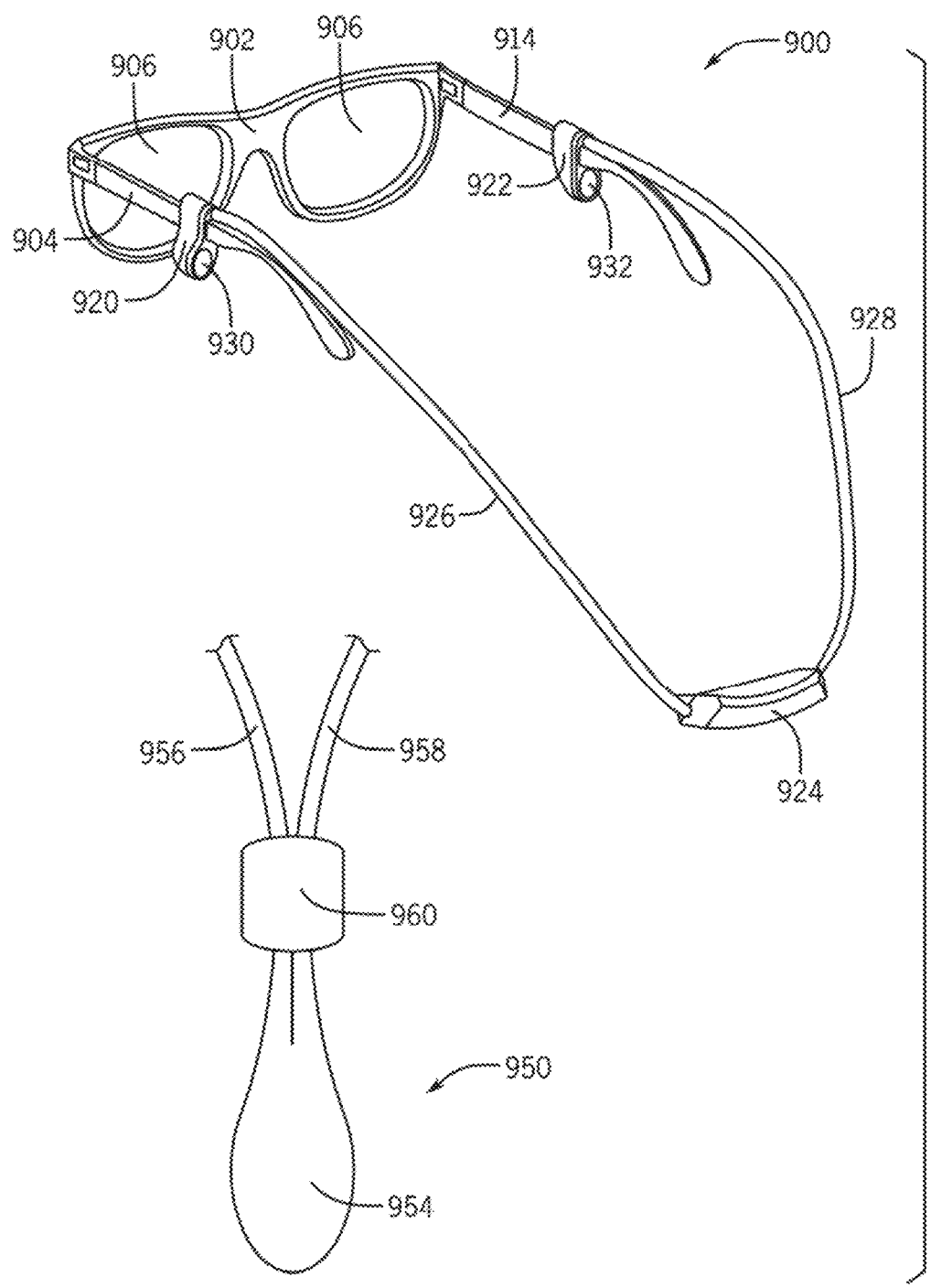
FIG. 9 illustrates a modularized eyewear device fitted with a behind the neck module assembly, according to embodiments of the invention.

FIG. 9 illustrates a modularized eyewear device fitted with a behind the neck module assembly, according to embodiments of the invention. With reference to FIG. 9, at 900, a behind the neck module assembly is fitted to a passive set of eyewear. Passive eyewear indicates that there are no electronics located in the eyewear. Alternatively, the eyewear can be active or powered eyewear, as described herein, configured with electronics packaged into one or more temples or temple insert modules (TIMs). The eyewear has a frame chassis 902 that contains lens 906. Coupled to the frame chassis 902 is a left temple 904 and a right temple 914. The behind the neck module assembly includes a behind the neck electronics pod (ePOD) 924, a left temple interlock 920 a right temple interlock 922, a left smart cord 926 and a right smart cord 928. The left smart cord 926 couples electrically and mechanically the ePOD 924 to the left temple interlock 920 and the right smart cord couples electrically and mechanically the ePOD 924 to the right temple interlock 922.

The left temple interlock 920 contains an acoustic cavity, an audio speaker, and an acoustic port. The acoustic port for the left audio speaker is indicated at 930. The left smart cord 926 contains electrical conductors that provide an audio signal for the audio speaker contained within the left temple interlock 920. In one or more embodiments, the audio speaker contained in the left temple interlock is a micro-projection speaker. Similarly, the acoustic port for the right audio speaker is indicated at 932. The right smart cord 928 contains electrical conductors that provide an audio signal for the audio speaker contained within the right temple interlock 922. In one or more embodiments, the audio speaker contained in the right temple interlock is a micro-projection speaker.

In various embodiments, the ePOD 924 contains an electronics unit. The electronics unit contains the electronic components and functionality described herein for a temple insert module (TIM). In other words, the electronics unit is a TIM mechanically and electrically packaged for use in a behind the neck module assembly.

Electronics units having different electronic configuration and functionality can be swapped in and out of the ePOD in similar fashion to the way different TIMs are swapped into and out of a temple of an eyewear device.

At 950 a length adjustment is provided to shorten or lengthen the right smart cord and the left smart cord. A behind the neck electronics pod (ePOD) 954 is configured with a left smart cord 956 and a right smart cord 958 exiting the same end of the ePOD 954. Such a configuration of the smart cords 956 and 958 permit a slider 960 to move either away from the ePOD or toward the ePOD. Moving the slider 960 away from the ePOD 954 shortens the available free length of the smart cords 965/958. Moving the slider 960 towards the ePOD 954 increases the available free length of smart cords 956/958.

In one or more embodiments, in operation when in an "on" state, audio data is streamed to the electronics unit in the ePOD 924 and is directed to the left and right speakers for broadcast to a user when the behind the neck module assembly is installed on an eyewear device and the user wears the eyewear device.

Figure 10:
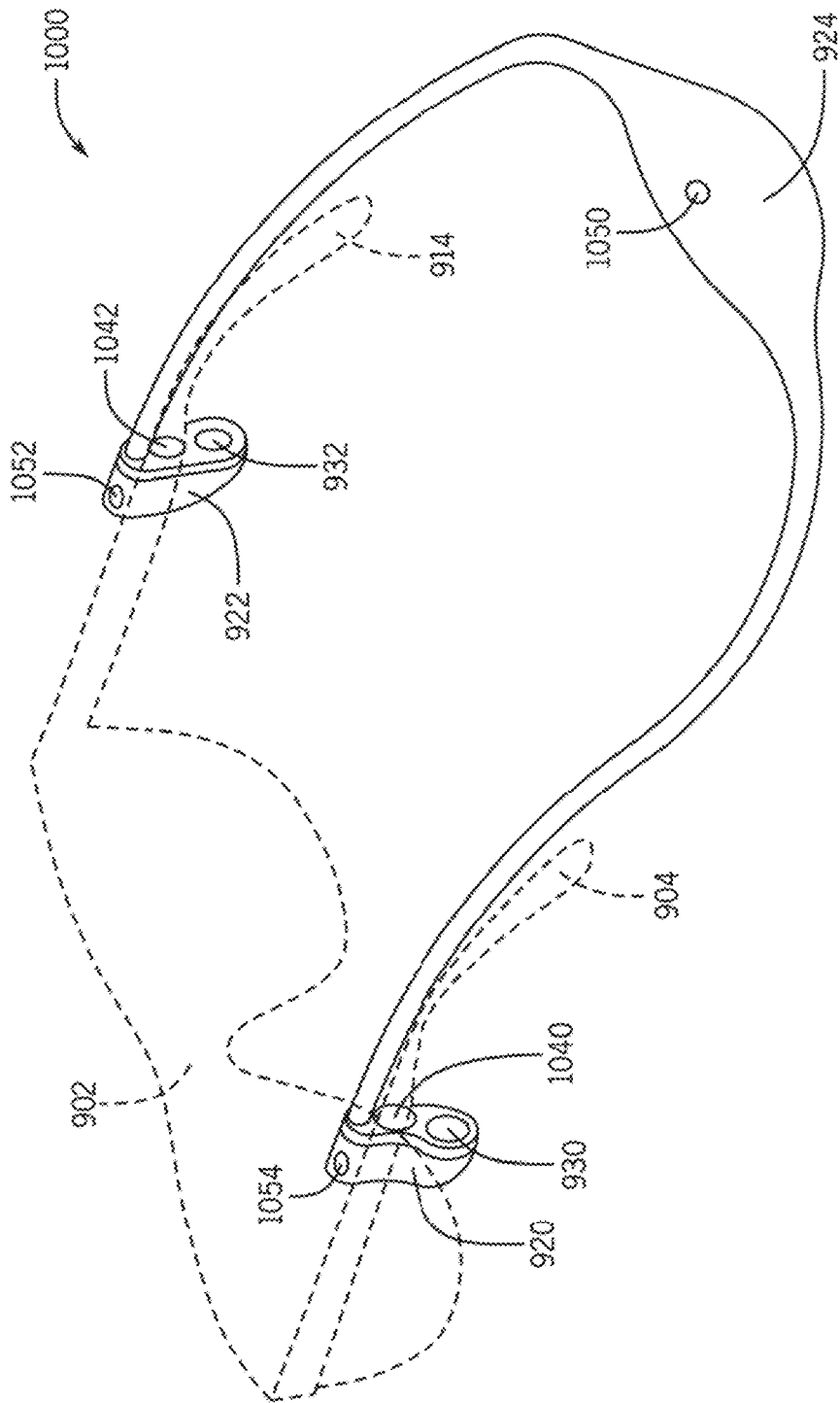
FIG. 10 illustrates a behind the neck module assembly in perspective view configured with a wearable device, according to embodiments of the invention.

FIG. 10 illustrates, generally at 1000, a behind the neck module assembly in perspective view configured with a wearable device, according to embodiments of the invention. With reference to FIG. 10, a first sensor 1050 is illustrated on the ePOD 924. A second sensor 1052 is illustrated incorporated into the right temple interlock 922. A third sensor 1054 is illustrated incorporated into the left temple interlock 920. The sensors 1050, 1052, and 1054 can be any of the sensors described herein previously described for use in a TIM or directly in electronics built into a temple.

In the embodiment shown in FIG. 10, each temple interlock module, i.e., 920 and 922 contains a through hole into which a temple of the eyewear is inserted. In this embodiment, the temple interlock modules 920 and 922 are made from a compliant material such as an elastomer or rubber that permits elongation sufficient for a temple to be inserted therethrough. For example, the left temple interlock 920 contains a through hole 1040 into which the left temple 904 is inserted. The right temple interlock 922 contains a through hole 1042 into which the right temple 914 is inserted. Each of the temple interlocks 920 and 922 are positioned on a pair of compatible eyewear such that each of the speaker ports 930 and 932 are positioned in front of and near to a user's ear. Compatible eyewear is eyewear that is compatible with the mechanical attachment provided by the temple interlocks.

Figure 11:
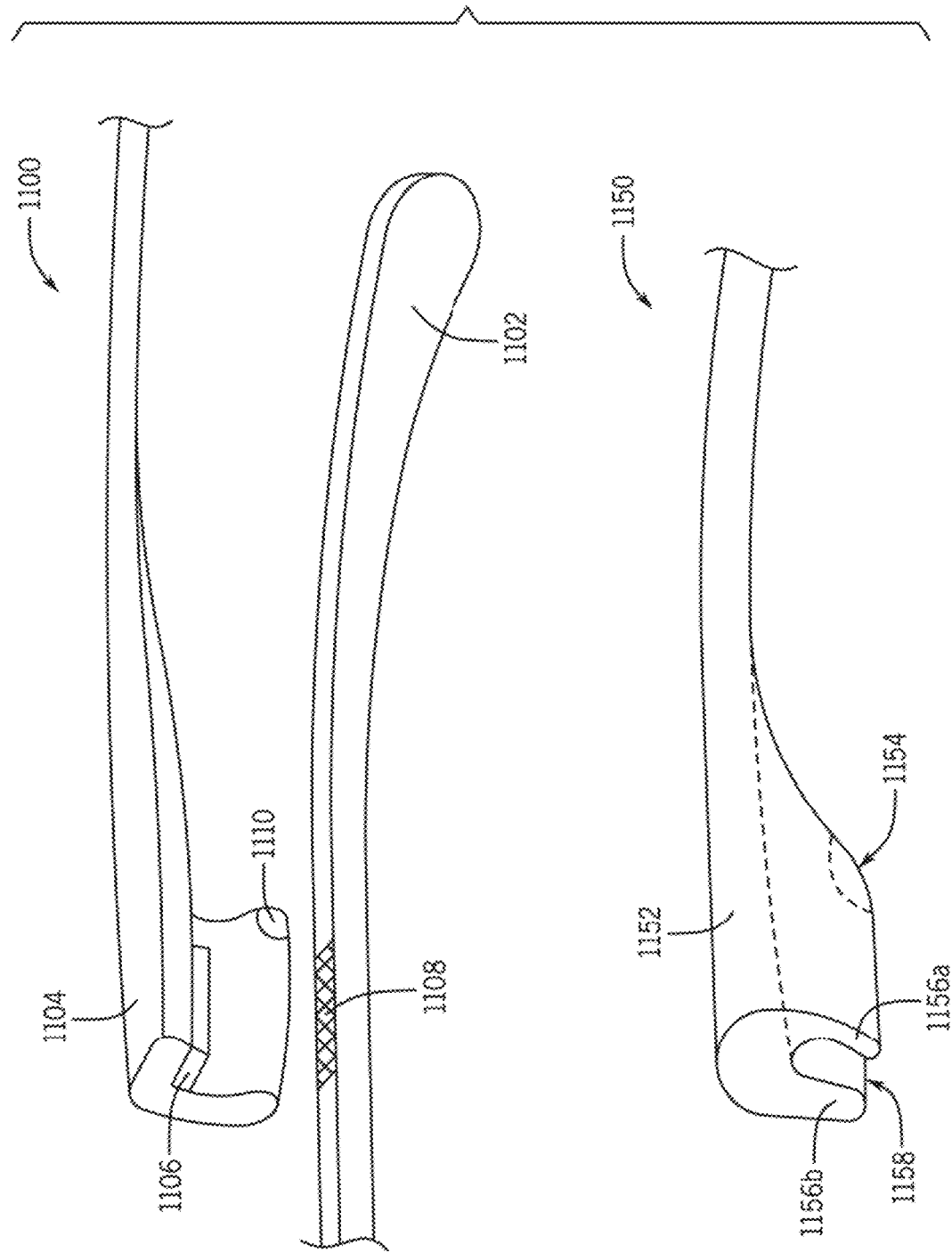
FIG. 11 illustrates coupling a temple interlock to a temple according to embodiments of the invention.

FIG. 11 illustrates, generally at 1100 and 1150, coupling a temple interlock to a temple according to embodiments of the invention. With reference to FIG. 11, at 1100 a magnetic temple interlock is illustrated. The magnetic temple interlock includes a magnetic region 1108 on a temple 1102 of an eyewear device. A temple interlock 1104 has a corresponding magnetic region 1106. In operation, the magnetic regions 1106 and 1108 are brought together, thereby causing the magnetic regions 1106 and 1108 to attract each other which provides a clamping force between the temple interlock 1104 and the temple 1102. A port of an acoustic cavity that contains a speaker is illustrated at 1110.

Another method of clamping is illustrated at 1150. A temple interlock 1152 contains a slot 1158 between a first side 1156a and a second side 1156b of compliant material. The geometry of 1158, 1156a, and 1156b forms a U shape into which a temple of an eyewear device can be inserted. The elasticity of the material 1152 provides a releasable coupling between the temple interlock 1152 and the temple of the eyewear (not shown). An acoustic port of an acoustic cavity that houses a speaker is indicated at 1154.

Figure 12:
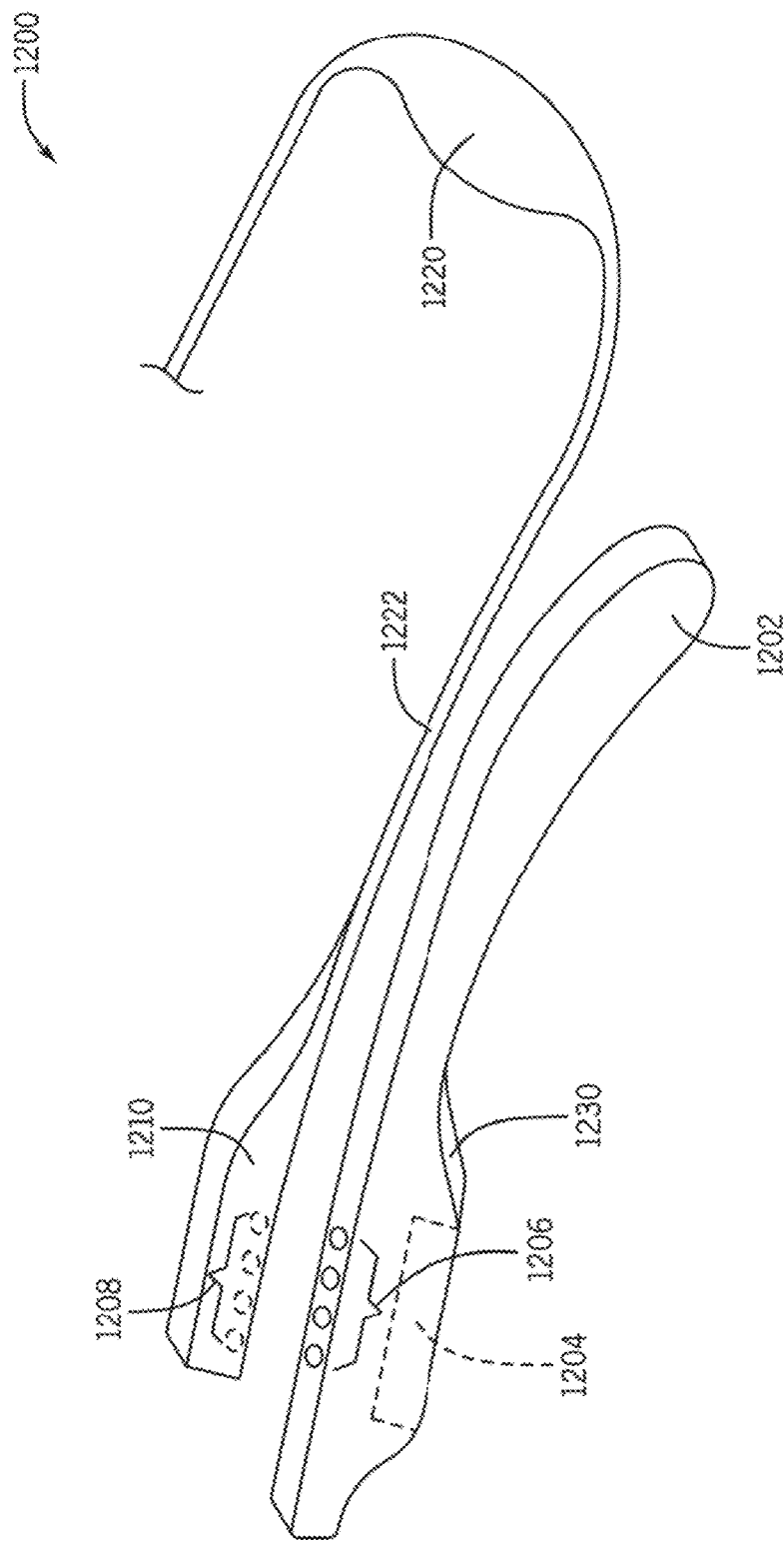
FIG. 12 illustrates coupling a behind the neck module to electronics contained within a temple, according to embodiments of the invention.

FIG. 12 illustrates, generally at 1200, coupling a behind the neck module to electronics contained within a temple, according to embodiments of the invention. With reference to FIG. 12, a behind the neck module assembly is coupled to electronics contained within a temple. A portion of a behind the neck module assembly is illustrated with a behind the neck electronics pod (ePOD) 1220, a left smart cord 1222, and a left temple interlock 1210. Any of the electronics contained with a temple, as previously described, can be contained directly within a temple without a temple insert module (TIM). Or alternatively, the electronics contained with the temple can be electronics that are part of a TIM, as indicated optionally at 1204. In either situation, a temple 1202 is provided with a number of electrical contacts indicated at 1206. A corresponding number of electrical contacts 1208 are provided in the left temple interlock 1210. A mechanical interlock between the temple 1202 and the left temple interlock 1210 is provided to make the connection between 1210 and 1202 releasably couplable. In one or more embodiments a magnetic coupling is provided near or at the location of 1206/1208 to provide a releasable coupling thereto.

Figure 13:
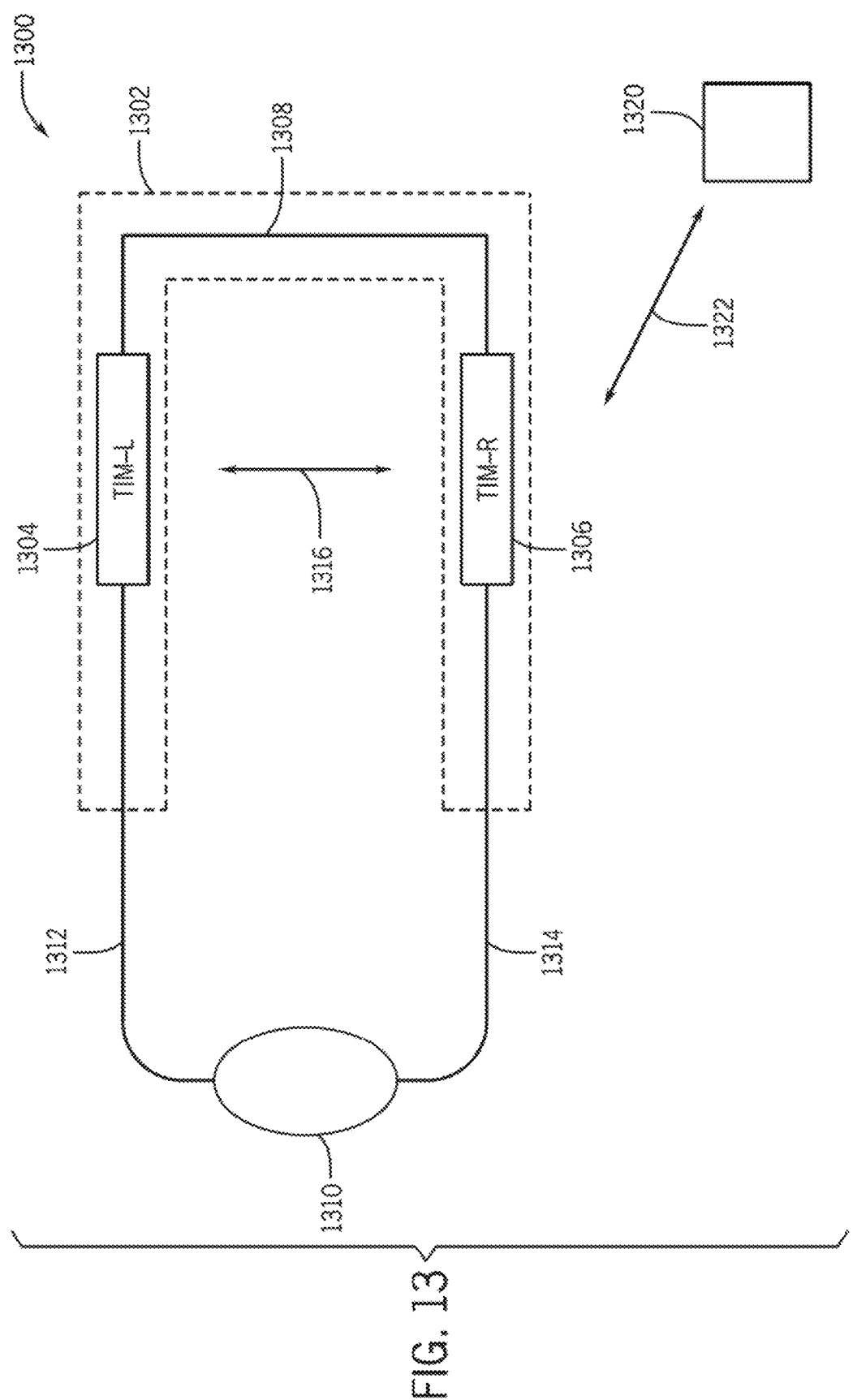
FIG. 13 illustrates a schematic for combining a behind the neck module assembly with temple electronics, according to embodiments of the invention.

FIG. 13 illustrates, generally at 1300, a schematic for combining a behind the neck module assembly with temple electronics, according to embodiments of the invention. With reference to FIG. 13, an outline of an eyewear device is indicated at 1302. The eyewear device 1302 contains electronics and or electronic pathways in a left temple, a right temple, and a frame chassis. The outline 1302 encompasses the frame chassis, left temple, and right temple. In the system depicted in the figure, an electronics path 1308 extends between the left temple and the right temple of the eyewear device 1302.

The eyewear device contains a left temple insert module (TIM) 1304 located in a left temple and a right TIM 1306 located in a right temple. A behind the neck module assembly with electronics unit (ePOD) is indicated at 1310. A left smart cord 1312 provides an electrical pathway between the ePOD 1310 and the left TIM 1304. A right smart cord 1314 provides an electrical pathway between the ePOD 1310 and the right TIM 1306. In various embodiments both the left TIM 1304 and the right TIM 1306 are configured with one or more wireless communication network systems that permit wireless communication between the left TIM 1304 and the right TIM 1306 as indicated at 1316. A remote device 1320 is representative of one or more wireless sensors or wireless user devices as described above in conjunction with the preceding figures. Wireless communication 1322 is accomplished between the remote device 1320 and at least one of the left TIM 1304, the right TIM 1306, and the ePOD 1310. All of the electronic system functionality described above with respect to a TIM is applicable to an ePOD such as ePOD 1310.

In some embodiments, a left temple is not electrically connected to a right temple, in such as case the electrical path 1308 is removed from the electrical schematic shown in 1300.

Figure 14:
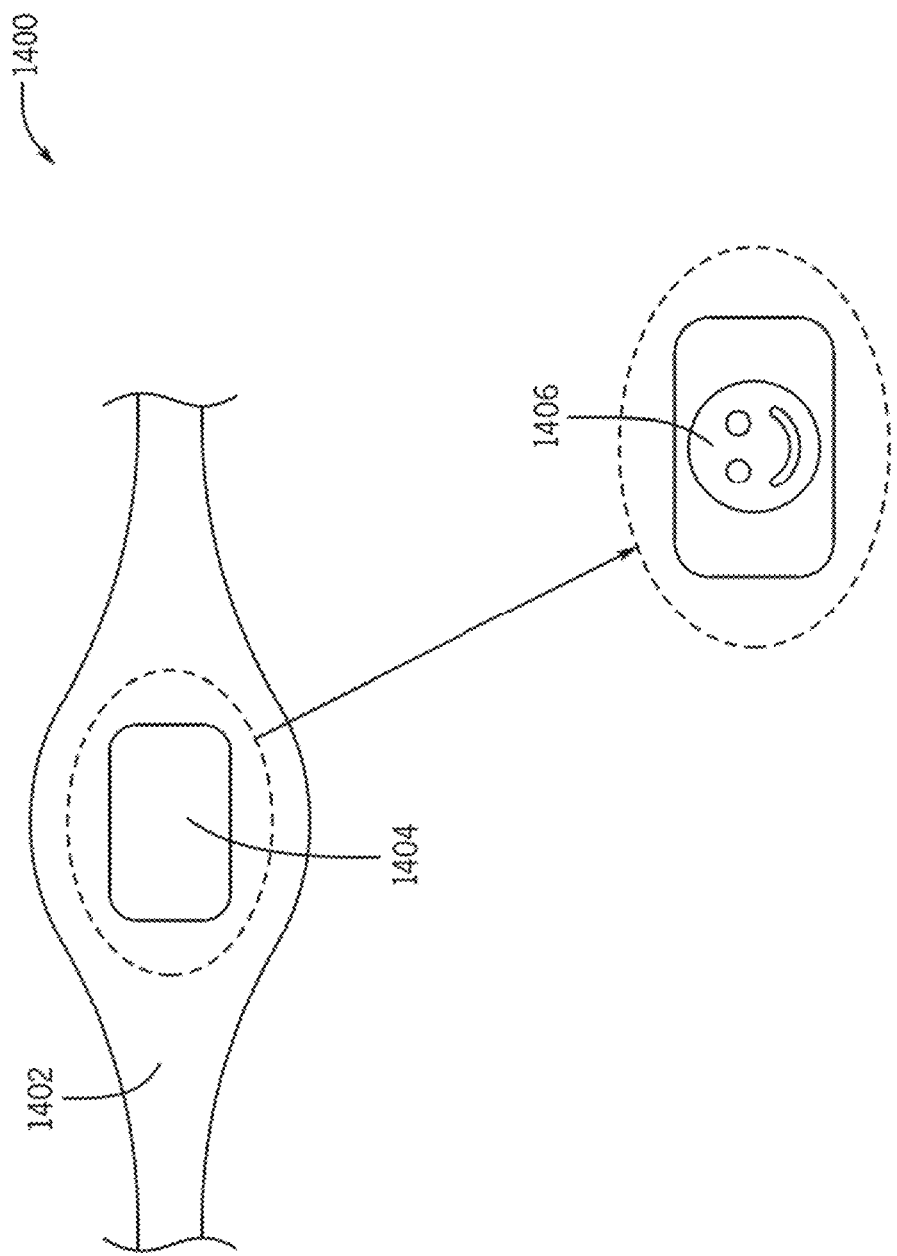
FIG. 14 illustrates a user interface on a behind the neck module assembly, according to embodiments of the invention.

FIG. 14 illustrates, generally at 1400, a user interface on a behind the neck module assembly, according to embodiments of the invention. With reference to FIG. 14, a behind the neck electronics pod (ePOD) is illustrated at 1402. The ePOD 1402 has a display interface 1404. The display interface 1404 can be implemented in various ways in different embodiments. In some embodiments the user interface is a tactile surface button. In some embodiments, the user interface is implemented with a touch screen, such as a capacitive touch screen presenting one or more controls to a user. In some embodiments, the user interface communicates information to a user. In yet other embodiments, the user interface communicates information to a person who views the user interface 1404 from behind the user who is wearing the ePOD 1402. An example of such information is, but is not limited to, an emoji, mood status, icon, etc. as indicated at 1406.

Figure 15:
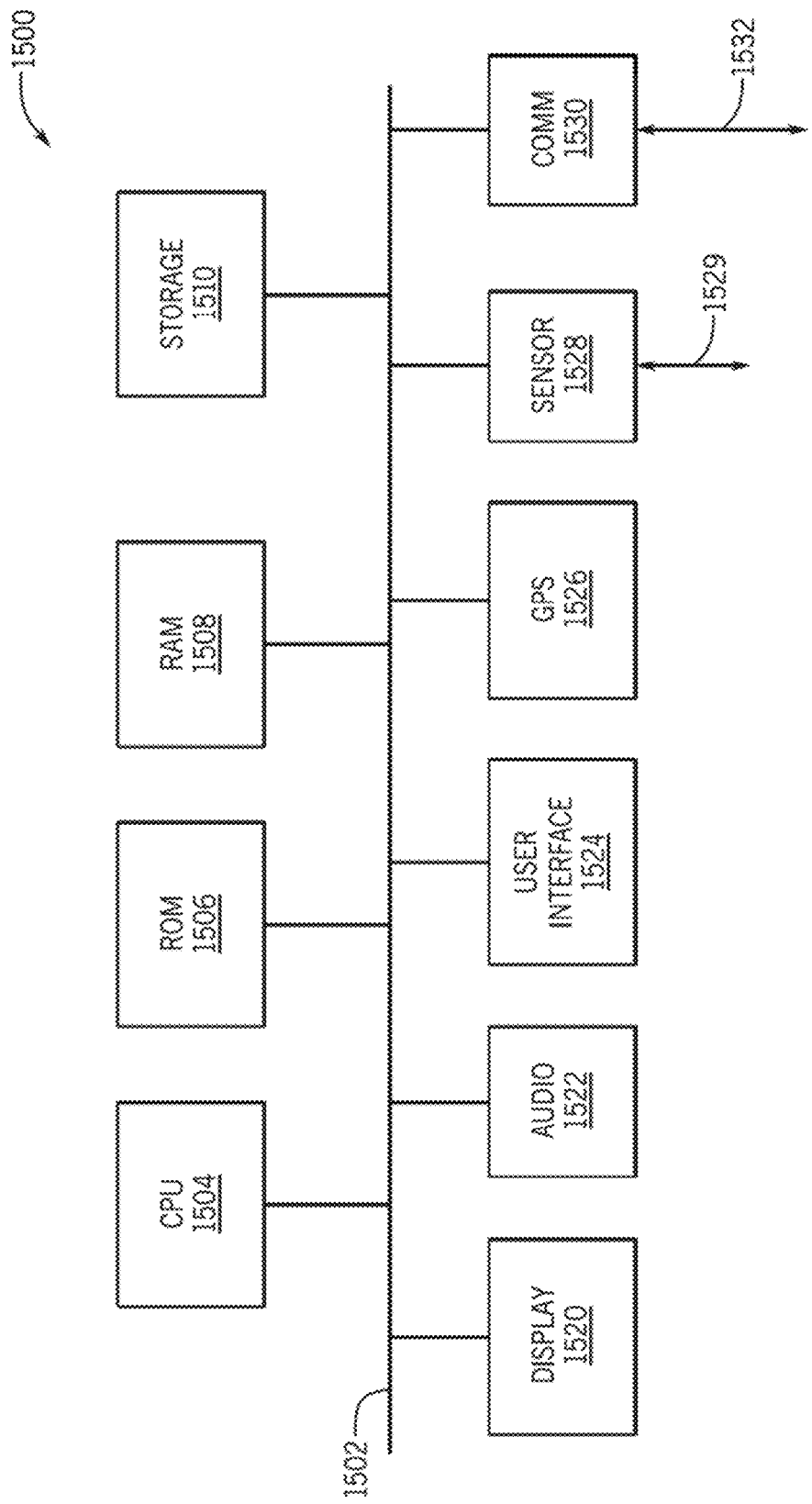
FIG. 15 illustrates a block diagram for an electronics unit configured for a behind the neck electronics pod (ePOD), according to embodiments of the invention.

FIG. 15 illustrates, generally at 1500, a block diagram for an electronics unit configured for a behind the neck electronics pod (ePOD), according to embodiments of the invention. With reference to FIG. 15, as used in this description of embodiments, a behind the neck electronics unit can be based on a device such as a computer, in which embodiments of the invention may be used. The block diagram is a high-level conceptual representation and may be implemented in a variety of ways and by various architectures. Bus system 1502 interconnects a Central Processing Unit (CPU) 1504 (alternatively referred to herein as a processor), Read Only Memory (ROM) 1506, Random Access Memory (RAM) 1508, storage 1510, audio 1522, user interface 1524, and communications 1530. RAM 1508 can also represent dynamic random-access memory (DRAM) or other forms of memory. The user interface 1524 can be in various embodiments a voice interface, a touch interface, a physical button, or combinations thereof. It is understood that memory (not shown) can be included with the CPU block 1504. The bus system 1502 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 994 (FireWire), Universal Serial Bus (USB), universal asynchronous receiver-transmitter (UART), serial peripheral interface (SPI), inter-integrated circuit (I2C), etc. The CPU 1504 may be a single, multiple, or even a distributed computing resource. Storage 1510 may be flash memory, etc. Note that depending upon the actual implementation of a behind the neck electronics unit, the behind the neck electronics unit may include some, all, more, or a rearrangement of components in the block diagram. Thus, many variations on the system of FIG. 15 are possible.

Connection with one or more wireless networks 1532 is obtained via communication (COMM) 1530, which enables the behind the neck electronics unit 1500 to communicate wirelessly with local sensors, local devices, as well as with remote devices on remote networks. In some embodiments, 1532/1530 provide access to remote voice-to-text conversion systems which can be in remote locations, for example cloud based. 1532 and 1530 flexibly represent wireless communication systems in various implementations, and can represent various forms of telemetry, general packet radio service (GPRS), Ethernet, Wide Area Network (WAN), Local Area Network (LAN), Internet connection, Wi-Fi, WiMAX, ZigBee, Infrared, Bluetooth, near-field communications, mobile telephone communications systems, such as 3G, 4G, LTE, 5G, etc. and combinations thereof. In various embodiments, a touch interface is optionally provided at 1524. An optional display is provided at 1520. Signals from one or more sensors are input to the system via 1529 and 1528. Global position system (GPS) information is received and is input to the system at 1526. Audio can represent a speaker such as a projection speaker or projection micro-speaker described herein.

In various embodiments, depending on the hardware configuration, different wireless protocols are used in the networks to provide the systems described in the figures above. One non-limiting embodiment of a technology used for wireless signal transmission is the Bluetooth wireless technology standard which is also commonly known as IEEE 802.15.1 standard. In other embodiments, the wireless signal transmission protocol known as Wi-Fi is used which uses the IEEE 802.11 standard. In other embodiments, the ZigBee communication protocol is used which is based on the IEEE 802.15.4 standard. These examples are given merely for illustration and do not limit different embodiments. Transmission Control Protocol (TCP) and Internet Protocol (IP) are also used with different embodiments. Embodiments are not limited by the data communication protocols listed herein and are readily used with other data communication protocols not specifically listed herein.

In various embodiments, the components of systems as well as the systems described in the previous figures (such as a behind the neck electronics unit) are implemented in an integrated circuit device, which may include an integrated circuit package containing the integrated circuit. In some embodiments, the components of systems as well as the systems are implemented in a single integrated circuit die. In other embodiments, the components of systems as well as the systems are implemented in more than one integrated circuit die of an integrated circuit device which may include a multi-chip package containing the integrated circuit.

In various embodiments, the descriptions of embodiments provided herein provide reconfigurable components for head wearable devices. Reconfigurable components for head wearable devices include, but are not limited to, removable temples, removable temple insert modules (TIMs), a behind the neck module assembly, an electronics pod ePOD for a behind the neck module assembly and removable electronics units for ePOD.

In various embodiments, running on the data processing system(s) created with respect to various TIMs (800 in FIG. 8) or with respect to various behind the neck electronics units (1500 in FIG. 15) are one or more algorithms that provide useful functionality to a user. These algorithms are described below in conjunction with the following figures as procedures or synonymously methods and it will be understood by those of ordinary skill in the art that the algorithms may be run on hardware that is distributed across the systems in different ways. For example, in some embodiments, the algorithm will run on the hardware contained within a TIM or within a behind the neck electronics unit. In other embodiments, the algorithm or parts of the algorithm will run on a combination of a TIM and a device such as the devices 220, 670, 702, 1320, etc., shown in the figures above, or on a combination of a TIM, a device (220, 670, 702, 1320, etc.), and cloud based hardware and services available through one or more communication networks as described above in conjunction with the preceding figures. Similarly, in other embodiments, an algorithm or parts of the algorithm will run on a combination of a behind the neck electronics unit and a device such as the devices 220, 670, 702, 1320, etc., shown in the figures above, or on a combination of a behind the neck electronics unit, a device (220, 670, 702, 1320, etc.), and cloud based hardware and services available through one or more communication networks as described above in conjunction with the preceding figures.

Figure 16:
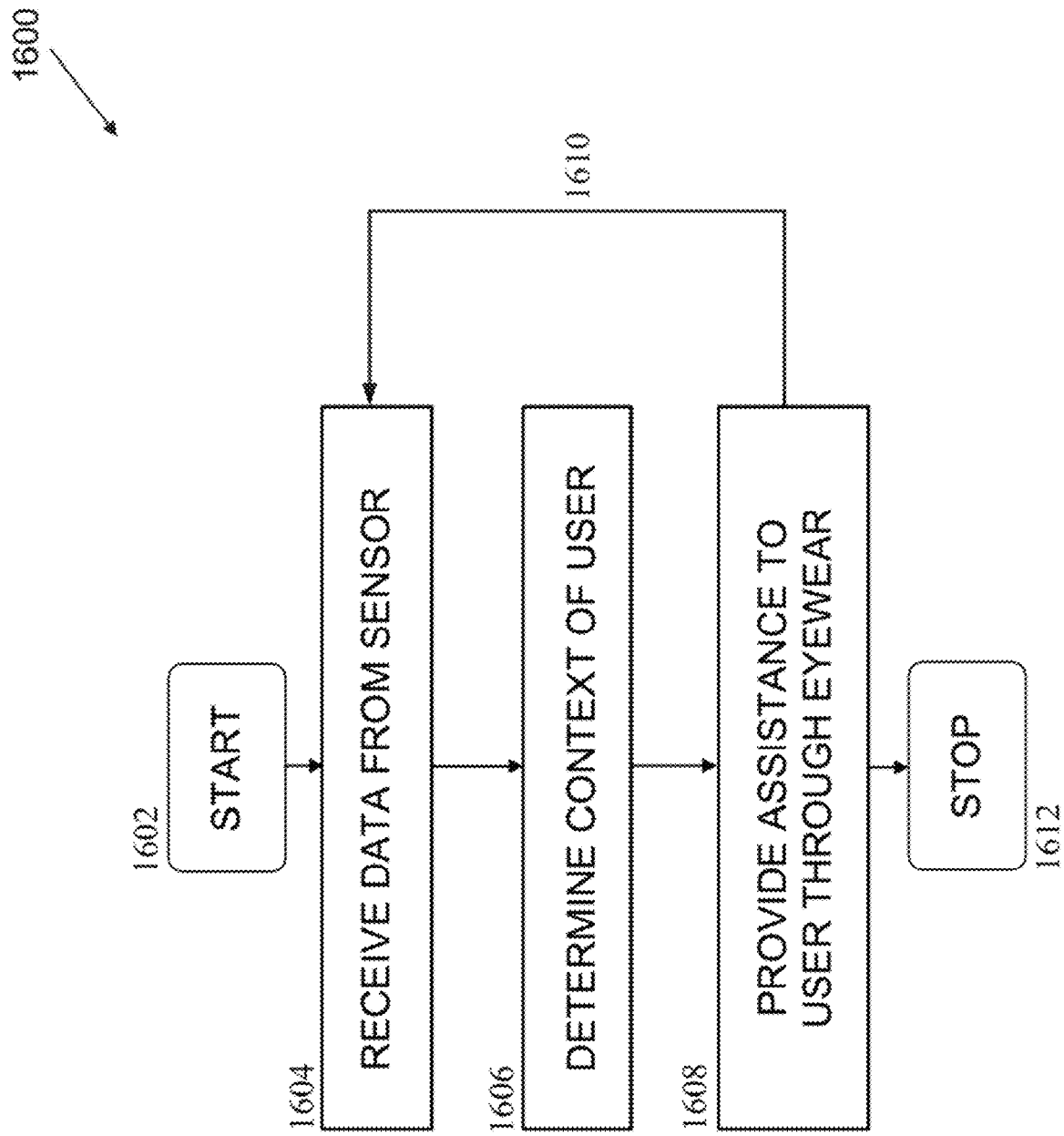
FIG. 16 illustrates a method for providing assistance to a user of an eyewear device, according to embodiments of the invention.

FIG. 16 illustrates, generally at 1600, a procedure for providing assistance to a user of an eyewear device, according to embodiments of the invention. With reference to FIG. 16, a process starts at a block 1602. At a block 1604, data is received from one or more sensors associated with an eyewear device. The eyewear device can be any of the eyewear devices described above, such as a modular reconfigurable eyewear device utilizing one or more temple insert modules (TIM) or a modularized eyewear device fitted with a behind the neck module assembly. In addition, the eyewear device need not be a modularized device, the eyewear device can be an eyewear device designed without modularity.

The one or more sensors in the block 1604 can be, for example, without limitation any sensor or combination of sensors described above, including camera(s), microphone(s), global position system (GPS) receiver, a multiaxis inertial measurement unit(s) containing accelerometers, gyroscopes, magnetometers, proximity sensor(s), motion sensor(s), gyroscope(s), magnetometer(s), display(s), temperature sensor(s), pressure sensor(s), infrared sensor(s), biometric sensor(s), biomechanical sensor(s), such as but not limited to Electrodermal Activity (EDA) sensor(s) including but not limited to Galvanic Skin Response (GSR) sensor(s), heart rate sensor(s), breathing rate sensor(s), etc. Thus, in various embodiments, roll, pitch, heading, position, and velocity of a user wearing an eyewear device are available through data output from sensors in the block 1604.

At a block 1606 a context of the user is determined. As used in this description of embodiments, a context of a user includes one or more of a physical orientation, an activity, and an environment that the user is in. A user's context can change as a function of time and can be a dynamic property or it can be a static property. Context of a user is described more fully below in conjunction with FIG. 18. The context is determined with the data received in the block 1604. In the block 1608, assistance is provided to the user in a form of feedback through the eyewear device. The feedback can be one or more of audio feedback through a speaker embedded in the eyewear device, vibration imparted to the user through the eyewear device, and feedback from a device located in the user's environment mediated by the eyewear device. At the block 1606, data from the one or more sensors is analyzed, for example, tracking head posture and or movement of the user or lack of user movement. Based on the analysis of the data, assistance is provided to the user at the block 1608 through, for example, a communication to the user. The assistance can be in the form of an audio message broadcast from a speaker embedded in the eyewear device to remind the user of a negative condition that the user is experiencing based on an analysis of the context and the data from the sensor(s). Negative conditions are conditions in which some detriment to the user might result either imminently or at some future time, such as, but not limited to, lack of sufficient frequency of movement or maintaining a stationary position of the head for too long a period of time. In this example, the detriment is an impairment to the user's biomechanical function. Assistance can also be assistance that affirms a positive condition, such as acknowledgment that sufficient head movement is occurring, or that sufficient physical activity is occurring. The assistance can be broadcast to the user through a speaker or speakers incorporated with the eyewear device. Control of an algorithm implementing the process of 1600 can continuously loop as indicated at 1610 to continuously receive data at the block 1604, analyze context at the block 1606, and provide assistance as needed at the block 1608. Thereby providing real-time assistance to the user based on the user's changing context as a function of time.

The process stops at the block 1612. A trigger to stop the process at the block 1612 can be when the user removes the eyewear device from the user's head. Such an event can be ascertained by the system through an output from a proximity sensor, indicating that the user's head is no longer proximate to the eyewear device. In another nonlimiting example, the process stops at the block 1612 when the user moves the temples of an eyewear device into a closed position, thereby shutting the system off through a switch triggered by closing a temple(s). Alternatively, the system can be powered down by voice command. These examples of initiating the block 1612 are given merely for illustration and do not limit embodiments of the invention.

Figure 17:
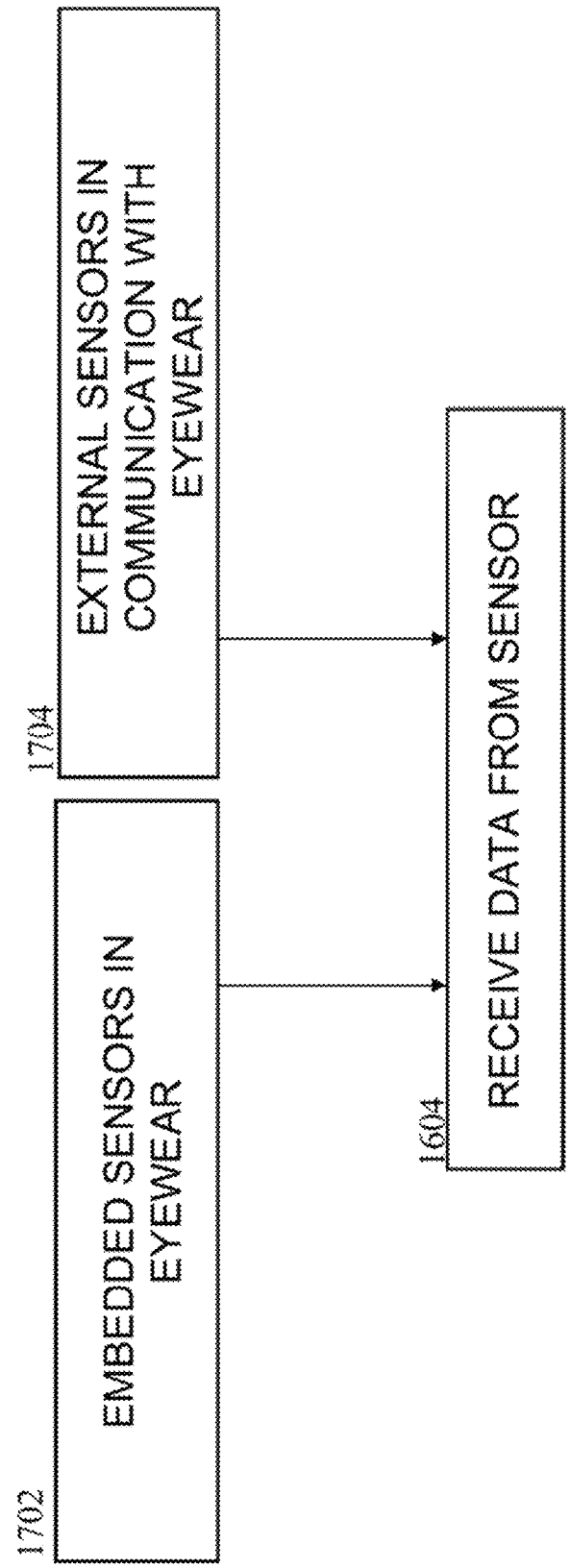
FIG. 17 illustrates receiving data from sensors associated with an eyewear device, according to embodiments of the invention.

FIG. 17 illustrates, generally at 1700, receiving data from sensors associated with an eyewear device, according to embodiments of the invention. With reference to FIG. 17, receiving data from sensors 1604 can include, in various embodiments, data from sensors that are embedded in the eyewear device at 1702. In addition, data can be received from sensors that are external to the eyewear device at 1704. An example of an external sensor is, but is not limited to, a sensor on a user's shirt button, measuring tension on the button or a sensor measuring pressure against a user's belt estimating abdominal expansion due to food intake. Similarly, an ingestible sensor that more accurately estimates caloric intake throughout a period of time can be used in some embodiments. Such sensors can be used to provide data that is used by the system to provide assistance to the user such as for example, "I think that you might have had enough to eat."

Figure 18:
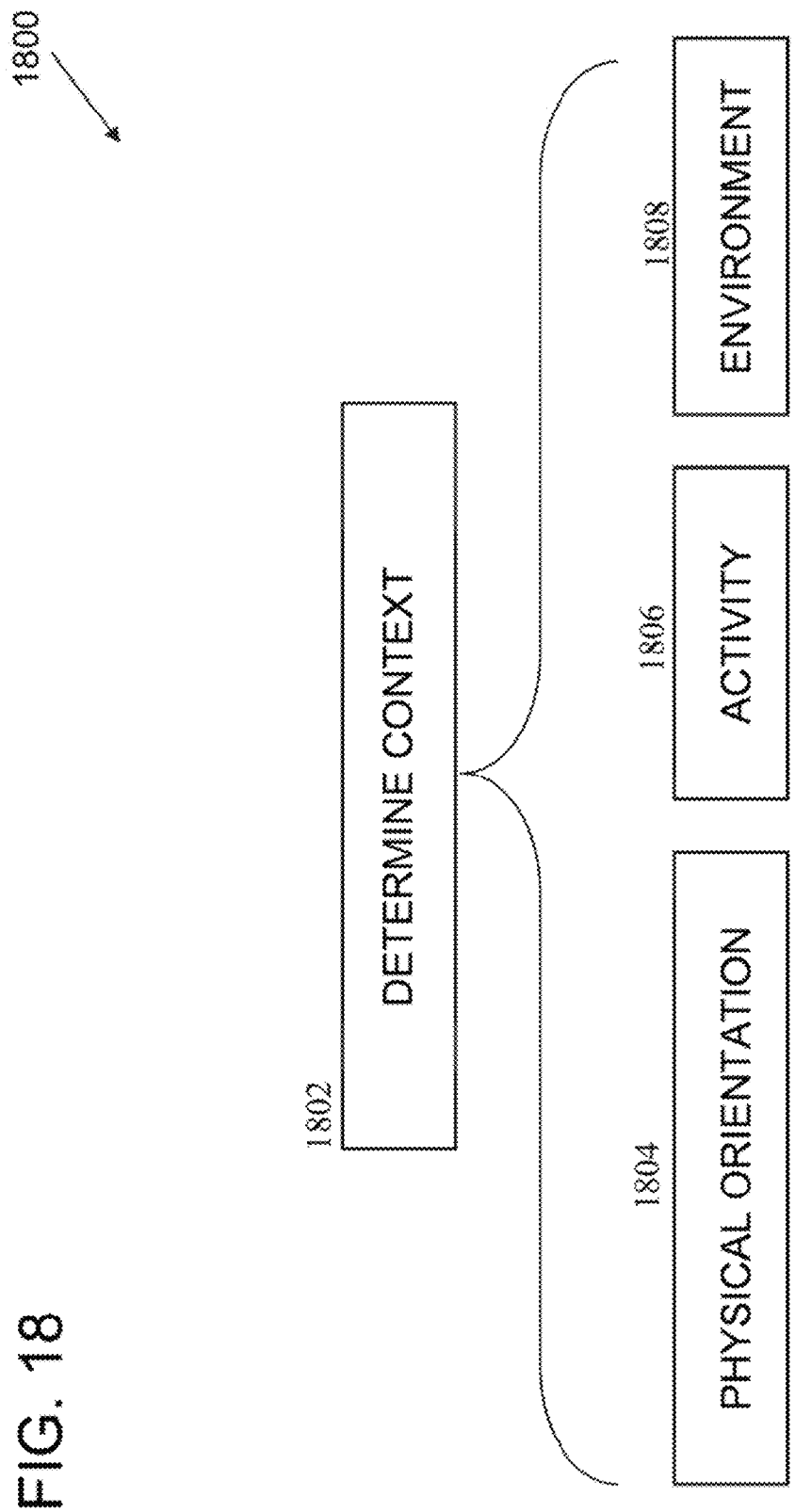
FIG. 18 illustrates context analysis of a user of an eyewear device, according to embodiments of the invention.

FIG. 18 illustrates, generally at 1800, context analysis of a user of an eyewear device, according to embodiments of the invention. With reference to FIG. 18, context analysis is illustrated at 1802. Context analysis 1802 includes one or more of a physical orientation indicated at 1804, a user activity indicated at 1806, and an environment that the user is in, indicated at 1808. Some non-limiting examples of a physical orientation 1804 of a user are, but are not limited to, sitting, standing, lying prone, inverted, etc. Some non-limiting examples of an activity 1806 of a user are, but are not limited to, walking, running, eating, etc. Some non-limiting examples of an environment 1808 that that a user is located in are, but are not limited to, automobile, truck, plane, train, bicycle, wheelchair, social setting, etc. Some non-limiting examples of social setting are, but are not limited to, a solitary setting, a public, etc.

Figure 19:
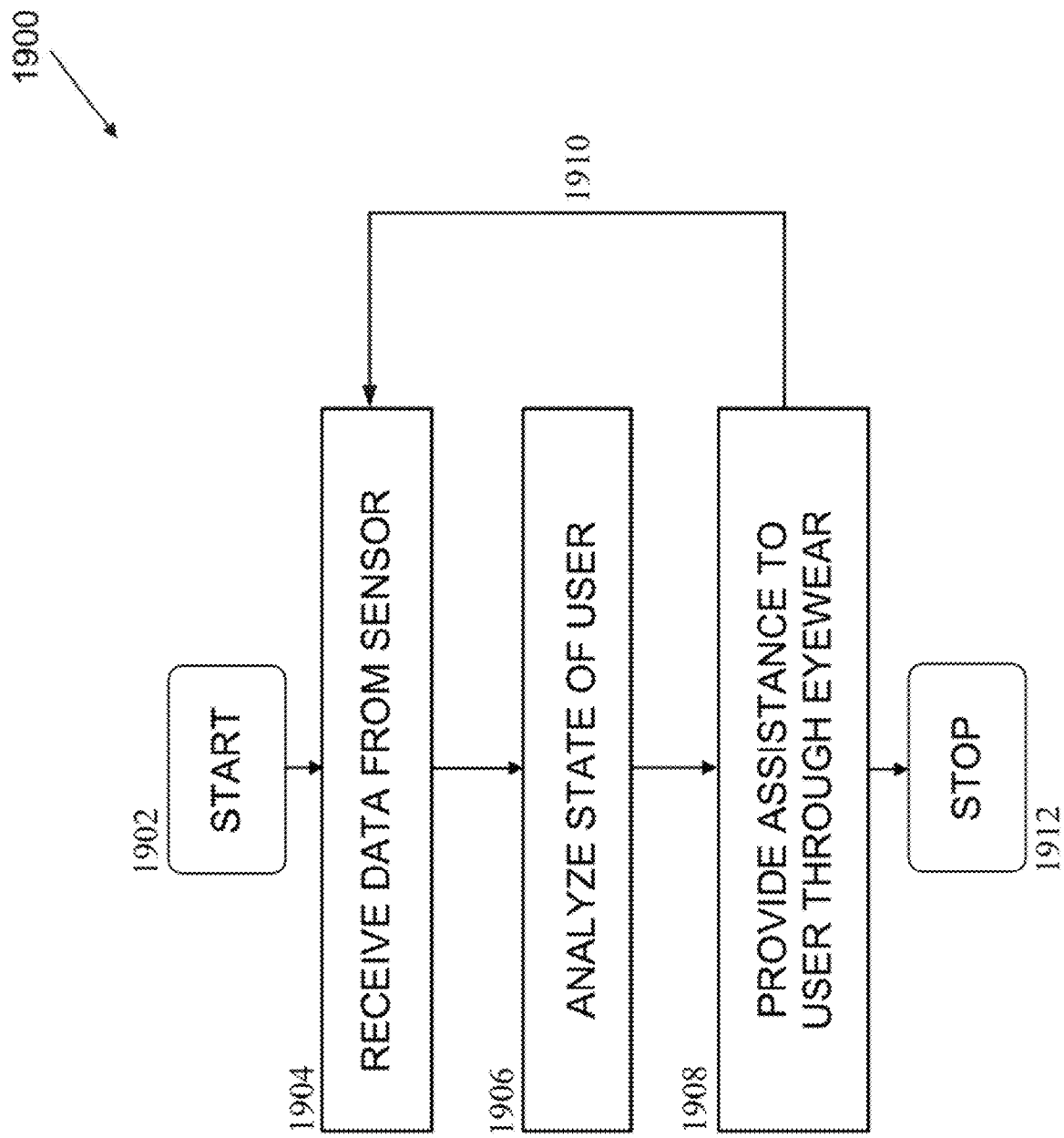
FIG. 19 illustrates another method for providing assistance to a user of an eyewear device, according to embodiments of the invention.

FIG. 19 illustrates generally at 1900, another procedure for providing assistance to a user of an eyewear device, according to embodiments of the invention. With reference to FIG. 19, a process starts at a block 1902. At a block 1904, data is received from one or more sensors associated with an eyewear device. The eyewear device can be any of the eyewear devices described above, such as a modular reconfigurable eyewear device utilizing one or more temple insert modules (TIM) or a modularized eyewear device fitted with a behind the neck module assembly. In addition, the eyewear device need not be a modularized device, the eyewear device can be an eyewear device designed without modularity.

The one or more sensors in the block 1904 can be, for example, without limitation any sensor or combination of sensors described above, including camera(s), microphone(s), global position system (GPS) receiver, a multiaxis inertial measurement unit(s) containing accelerometers, gyroscopes, magnetometers, proximity sensor(s), motion sensor(s), gyroscope(s), magnetometer(s), display(s), temperature sensor(s), pressure sensor(s), infrared sensor(s), biometric sensor(s), biomechanical sensor(s), such as but not limited to Electrodermal Activity (EDA) sensor(s) including but not limited to Galvanic Skin Response (GSR) sensor(s), heart rate sensor(s), breathing rate sensor(s), etc. Thus, in various embodiments, roll, pitch, heading, position, and velocity of a user wearing an eyewear device are available through data output from sensors in the block 1904.

At a block 1906 a state of the user is determined. A user's state can change as a function of time and can be a dynamic property or it can be a static property. A state of a user is described more fully below in conjunction with FIG. 20 and FIG. 21. The state is determined with the data received in the block 1904. In the block 1908, assistance is provided to the user in a form of feedback through the eyewear device. The feedback can be one or more of audio feedback through a speaker embedded in the eyewear device, vibration imparted to the user through the eyewear device, and feedback from a device located in the user's environment mediated by the eyewear device. At the block 1906, data from the one or more sensors is analyzed, for example, tracking head posture and or movement of the user or lack of user movement. Based on the analysis of the data, assistance is provided to the user, at the block 1908, through for example, a communication to the user. The assistance can be in the form of an audio message broadcast from a speaker embedded in the eyewear device to remind the user of a negative condition that the user is experiencing based on an analysis of the state and the data from the sensor(s). A negative condition is one in which some detriment to the user might occur either imminently or at some future time, such as, but not limited to, lack of sufficient frequency of movement or maintaining a stationary position of the head for too long a period of time. In this example, the detriment is an impairment to the user's biomechanical function. Assistance can also be assistance that affirms a positive condition, such as acknowledgment that sufficient head movement is occurring, or that sufficient physical activity is occurring. The assistance can be broadcast to the user through a speaker or speakers incorporated with the eyewear device. Control of an algorithm implementing the process of 1900 can continuously loop as indicated at 1910 to continuously receive data at the block 1904, determine state at the block 1906, and provide assistance as needed at the block 1908. Thereby providing real-time assistance to the user based on the user's changing state as a function of time.

The process stops at the block 1912. A trigger to stop the process at the block 1912 can be when the user removes the eyewear device from the user's head. Such an event can be ascertained by the system through an output from a proximity sensor, indicating that the user's head is no longer proximate to the eyewear device. In another nonlimiting example, the process stops at the block 1912 when the user moves the temples of an eyewear device into a closed position, thereby shutting the system off through a switch triggered by closing a temple(s). Alternatively, the system can be powered down by voice command. These examples of initiating the block 1912 are given merely for illustration and do not limit embodiments of the invention.

The procedure of 1900, ultimately providing assistance to a user, is accomplished without actually determining the user's context. For example, in the example given above, the user might be in one or more different social settings (different contexts) which were not determined by the system. However, the procedure is sufficient to allow the system to determine that the user was experiencing a negative condition due to insufficiency of movement and to produce relevant assistance for the user that is delivered through the eyewear in order to avoid impairing the user's biomechanical function through inactivity.

Figure 20:
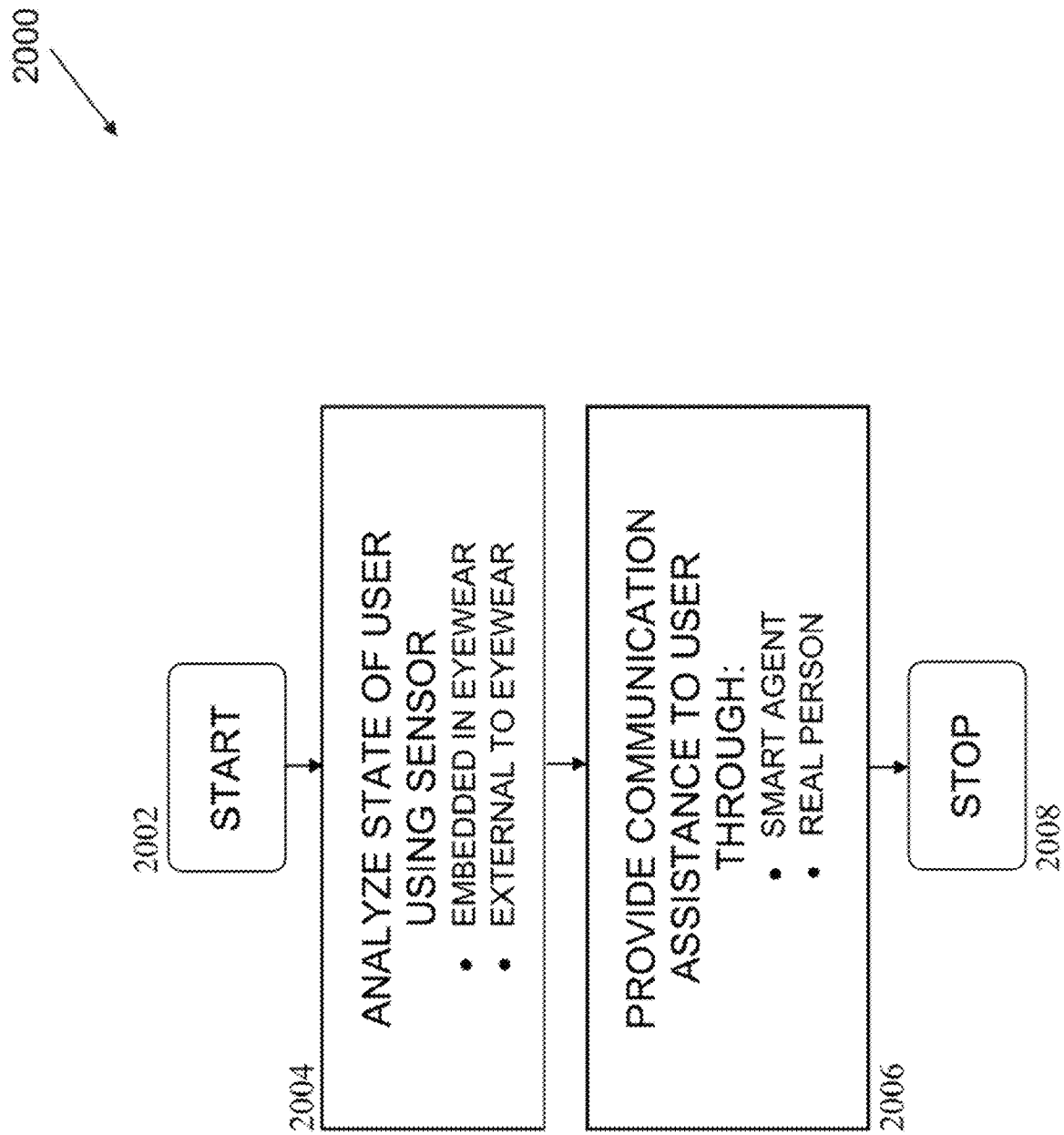
FIG. 20 illustrates user state analysis of a user of an eyewear device, according to embodiments of the invention.

FIG. 20 illustrates, generally at 2000, user state analysis of a user of an eyewear device, according to embodiments of the invention. With reference to FIG. 20, a process starts at a block 2002. At a block 2004 a state of a user is determined through utilizing sensors embedded in an eyewear device and, in some embodiments, through using sensors that are external to the eyewear device. At a block 2006, assistance is provided to the user by one or more of a synthetic smart agent or a real person. Examples of both are provided in conjunction with the discussion below.

Figure 21:
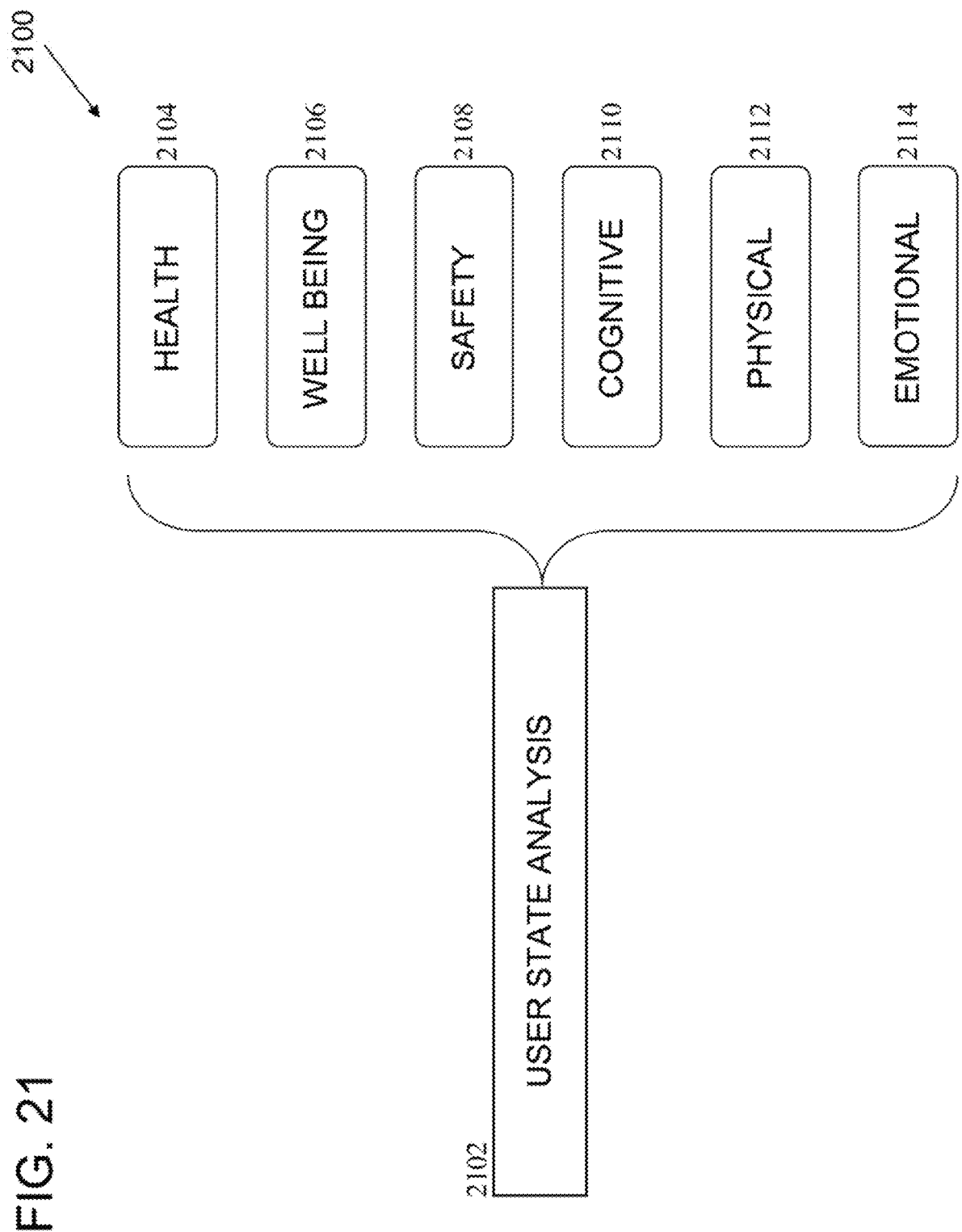
FIG. 21 illustrates different user states, according to embodiments of the invention.

FIG. 21 illustrates, generally at 2100, different user states, according to embodiments of the invention. With reference to FIG. 21, given for illustration, with no limitation implied thereby a user state analysis 2102 can have subcategories of Health 2104, Well Being 2106, Safety 2108, Cognitive 2110, Physical 2112, and Emotion 2114. FIG. 19, FIG. 20, and FIG. 21, taken together form a system that provides a plurality of assistance to a user. For example, a user of an eyewear device can be living at his or her home, on a boat, in a recreational vehicle, in an assisted living facility, etc. The system so configured with a medication timetable for the user can provide assistance to the user in a form of audio communication to remind the user to take medication at appointed times. In one non-limiting example, provided merely for illustration, at 11 AM the system produces an audio message that instructs the user to take his or her noon time medication before lunch. This is one non-limiting example of providing assistance relative to the state of Health 2104.

Continuing with an example provided herein, merely for illustration, with no limitation implied thereby, the system monitors the user's activity or inactivity. After a predetermined time of inactivity is logged by one or more sensors in the eyewear device at a time of day where activity is normally recorded, the system makes a determination that the user could be suffering from a physical or mental condition (e.g., depressive state, flu, etc.) because of the activity and or inactivity patterns that are recorded and analyzed, e.g., sleeping during the day, and notifies the user's son or daughter to call the user. The eyewear calls the son or daughter and communicates that the user has not moved in a period of time. The user's son or daughter calls the user and the user's state is checked or mood is lifted by the personal (physical) contact. The call could be made through a telephone in the user's room or directly through the eyewear device configured for telephone calls. Alternatively, a synthetic smart agent could be generated by the system to provide a communication to the user in such an instance suggesting to the user that it would be a good idea for the user to get up and move around. This is one non-limiting example of providing assistance relative to the state of Well Being 2106.

Continuing with an example provided herein, merely for illustration, with no limitation implied thereby, following the telephone contact from the son or the daughter or via the smart agent, the user could get up, trip, and then fall. A sensor in the eyewear device, such as for example and with no limitation implied thereby a multi-axis inertial measurement unit with embedded accelerometers would register a signal from the fall. This signal can be used to alert an appropriate person that the user has fallen and needs help. For example, if the user is living in an assisted living facility or nursing home with staff on call, appropriate notification of the fall is lodged with the staff. If the user is living independently, a call can be placed to 911 emergency services. Depending on a level of system complexity, a user's context can be entered as a setup parameter, determined by sensor data, or remain unknown which then requires the system to execute a default response to sensor data. This is one non-limiting example of providing assistance relative to the state of Safety 2108.

The system can evaluate the cognitive state of a user though one or more techniques such as, but not limited to, comparing an error rate of the voice recognition system while processing the user's speech against an historical error rate metric for a given user. If the error rate is exceptionally high, this can be an indication that the user has suffered a negative health event such as a stroke. A stroke can negatively impact a user's speech such the speech is unintelligible to a voice recognition system in the worst case. In addition, thereto, the system can test a user's cognitive state by propounding a number of questions to a user. Based on known answers to the questions, the system can make an assessment of the user's cognitive state. This is one non-limiting example of providing assistance relative to the Cognitive state at 2110.

Analysis of a user's posture through sensor data recorded as a function of time permits analysis of a user's posture, biomechanics, activity level, etc. Such analysis permits a system to compare a user's performance against that of a healthy user in order to render an analysis of the user's physical state. Based on such an analysis, corrective assistance can be generated by the system and communicated to the user. In the alternative if the user's path in life is consistent with that of a healthy state, a form of positive assistance can be generated and communicated to the user, such as, but not limited to: "you had a good day today marked by frequent breaks from sitting with 15,000 steps. Keep up the good work!" This is one non-limiting example of providing assistance relative to the state of Physical at 2112.

Analysis of a user's emotional state can be quantified through output of one or more biometric sensors, such as, but not limited to; heart rate, breathing rate, galvanic skin response, etc. Galvanic skin response measures changes in emotional state of a user though changes in skin conductivity. These data can be transmitted to and analyzed by health care workers during an evaluation of a user's emotional state. Such evaluation can be part of athletic training, administering a medical procedure such as a dental procedure, etc. In one or more embodiments, a frequency of heightened emotional state might be an indication of mental instability warranting medical intervention in order to prevent a negative outcome such as, in a worst case, suicide. A provider of medical services could use data on a user's emotional state during, for example, a dental procedure to make the user feel calmer and more relaxed. A galvanic skin response sensor can be located at the spots of the eyewear device that come into contact with the user's skin, such as, but not limited to, the nose bridge. These are some non-limiting examples of providing assistance relative to the state of Emotional at 2114.

Figure 22:
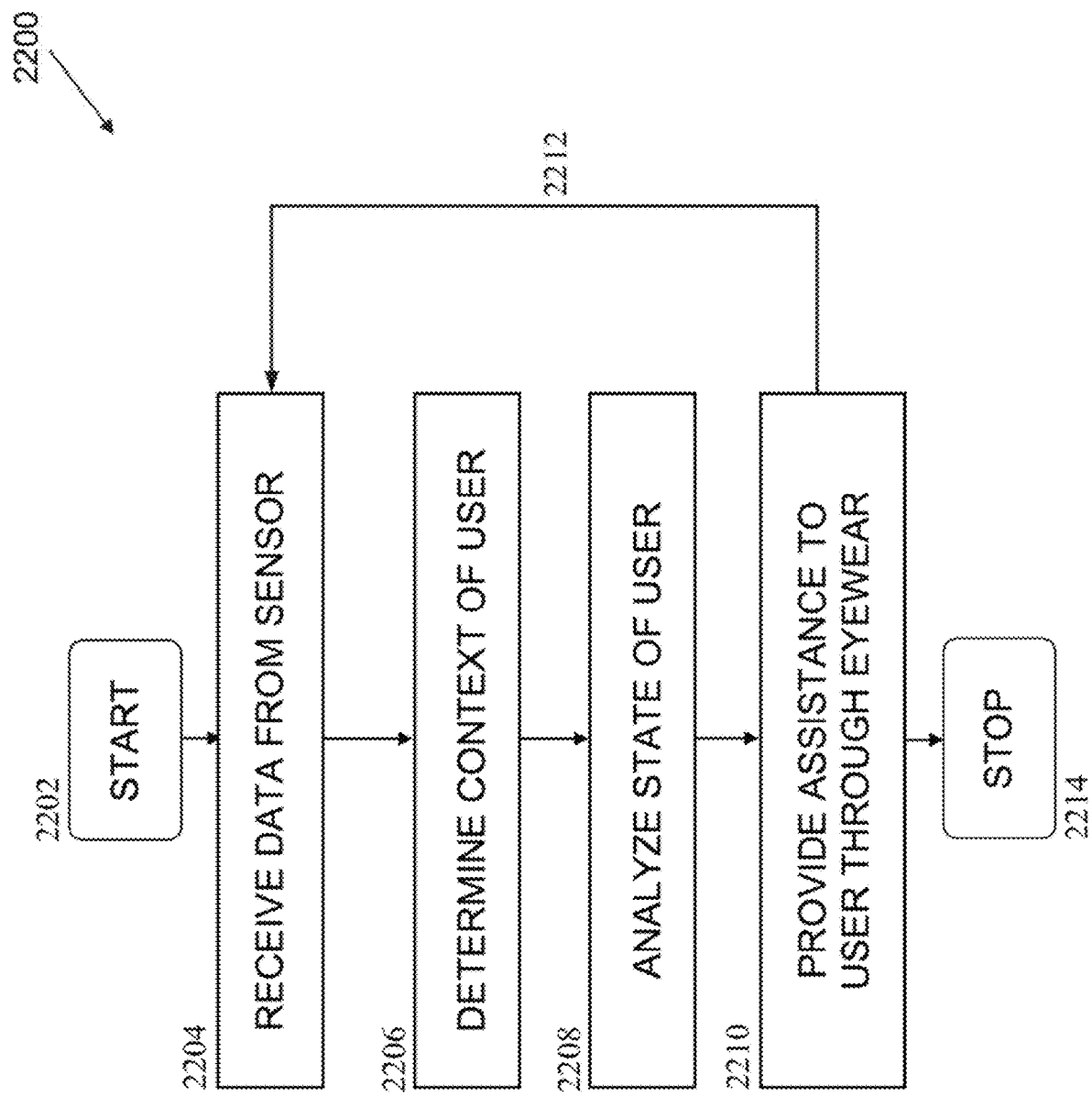
FIG. 22 illustrates a method that combines user context and state for providing assistance to a user of an eyewear device, according to embodiments of the invention.

FIG. 22 illustrates, generally at 2200, a procedure that combines user context and state for providing assistance to a user of an eyewear device, according to embodiments of the invention. With reference to FIG. 22, the process 2200 includes both determination of context for the user and analysis of a state of the user before assistance is rendered to the user. A process starts at a block 2202. At a block 2204, data is received from one or more sensors associated with an eyewear device. The eyewear device can be any of the eyewear devices described above, such as a modular reconfigurable eyewear device utilizing one or more temple insert modules (TIM) or a modularized eyewear device fitted with a behind the neck module assembly. In addition, the eyewear device need not be a modularized device, the eyewear device can be an eyewear device designed without modularity.

The one or more sensors in the block 2204 can be, for example, without limitation any sensor or combination of sensors described above, including camera(s), microphone(s), global position system (GPS) receiver, a multiaxis inertial measurement unit(s) containing accelerometers, gyroscopes, magnetometers, proximity sensor(s), motion sensor(s), gyroscope(s), magnetometer(s), display(s), temperature sensor(s), pressure sensor(s), infrared sensor(s), biometric sensor(s), biomechanical sensor(s), such as but not limited to Electrodermal Activity (EDA) sensor(s) including but not limited to Galvanic Skin Response (GSR) sensor(s), heart rate sensor(s), breathing rate sensor(s), etc. Thus, in various embodiments, roll, pitch, heading, position, and velocity of a user wearing an eyewear device are available through data output from sensors in the block 2204.

At a block 2206 a context of the user is determined. As used in this description of embodiments, context of a user includes one or more of, a physical orientation, an activity, and an environment that the user is in. A user's context can change as a function of time and can be a dynamic property or it can be a static property. Context of a user has been described more fully above in conjunction with FIG. 18. The context is determined with the data received in the block 2204.

At a block 2208 a state of the user is determined. A user's state can change as a function of time and can be a dynamic property or it can be a static property. A state of a user has been described more fully above in conjunction with FIG. 20 and FIG. 21. The state is determined with the data received in the block 2204. In the block 2210, assistance is provided to the user in a form of feedback through the eyewear device. The feedback can be one or more of audio feedback through a speaker embedded in the eyewear device, vibration imparted to the user through the eyewear device, and feedback from a device located in the user's environment mediated by the eyewear device. At the blocks 2206 and 2208, data from the one or more sensors is analyzed, for example, tracking head posture and or movement of the user or lack of user movement. Based on the analysis of the data, assistance is provided to the user, at the block 2210, through for example, a communication to the user. The assistance can be in the form of an audio message broadcast from a speaker embedded in the eyewear device to remind the user of a negative condition that the user is experiencing based on an analysis of the state and the data from the sensor(s). A negative condition is one in which some detriment to the user might occur either imminently or at some future time, such as, but not limited to, lack of sufficient frequency of movement or maintaining a stationary position of the head for too long a period of time. In this example, the detriment is an impairment to the user's biomechanical function. Assistance can also be assistance that affirms a positive condition, such as acknowledgment that sufficient head movement is occurring, or that sufficient physical activity is occurring. The assistance can be broadcast to the user through a speaker or speakers incorporated with the eyewear device. Control of an algorithm implementing the process of 2200 can continuously loop as indicated at 2212 to continuously receive data at the block 2204, determine context at the block 2206, analyze a user's state at the block 2208, and provide assistance as needed at the block 2210. Thereby providing real-time assistance to the user based on the user's changing context and state as a function of time.

The process stops at the block 2214. A trigger to stop the process at the block 2214 can be when the user removes the eyewear device from the user's head. Such an event can be ascertained by the system through an output from a proximity sensor, indicating that the user's head is no longer proximate to the eyewear device. In another nonlimiting example, the process stops at the block 2214 when the user moves the temples of an eyewear device into a closed position, thereby shutting the system off through a switch triggered by closing a temple(s). Alternatively, the system can be powered down by voice command. These examples of initiating the block 2214 are given merely for illustration and do not limit embodiments of the invention.

The procedure of 2200, ultimately providing assistance to a user, is accomplished with determining the user's context. Determining user context can increase the relevance of assistance that the system provides to the user. For example, in the example given above in conjunction with FIG. 19, the user might be in one or more social settings (context) which were not determined by the system. However, the process of FIG. 22 can determine context. Ultimately, the analysis might conclude that indeed the user has been inactive for a prolonged period of time, e.g., the user is experiencing a negative condition due to insufficiency of movement. The system might further conclude that the user's context justifies the inactivity, and that no assistance is required at the present time. In one non-limiting example, given merely for illustration, the system may determine that the user is taking an examination and that this is the reason for the inactivity. In such a case, the system would not provide the assistance provided in conjunction with the example of FIG. 19. The system would continue to loop at 2212, acquiring and processing further data at 2204 and determining context at 2206 until the context changed, for example the exam ended. Then if the user continued the inactivity the system would produce relevant assistance for the user that is delivered through the eyewear in order to avoid impairing the user's biomechanical function through further inactivity. Thus, in various embodiments, the assistance rendered to the user by the system is refined through context determination and user state analysis before assistance is rendered to a user.

Figure 23:
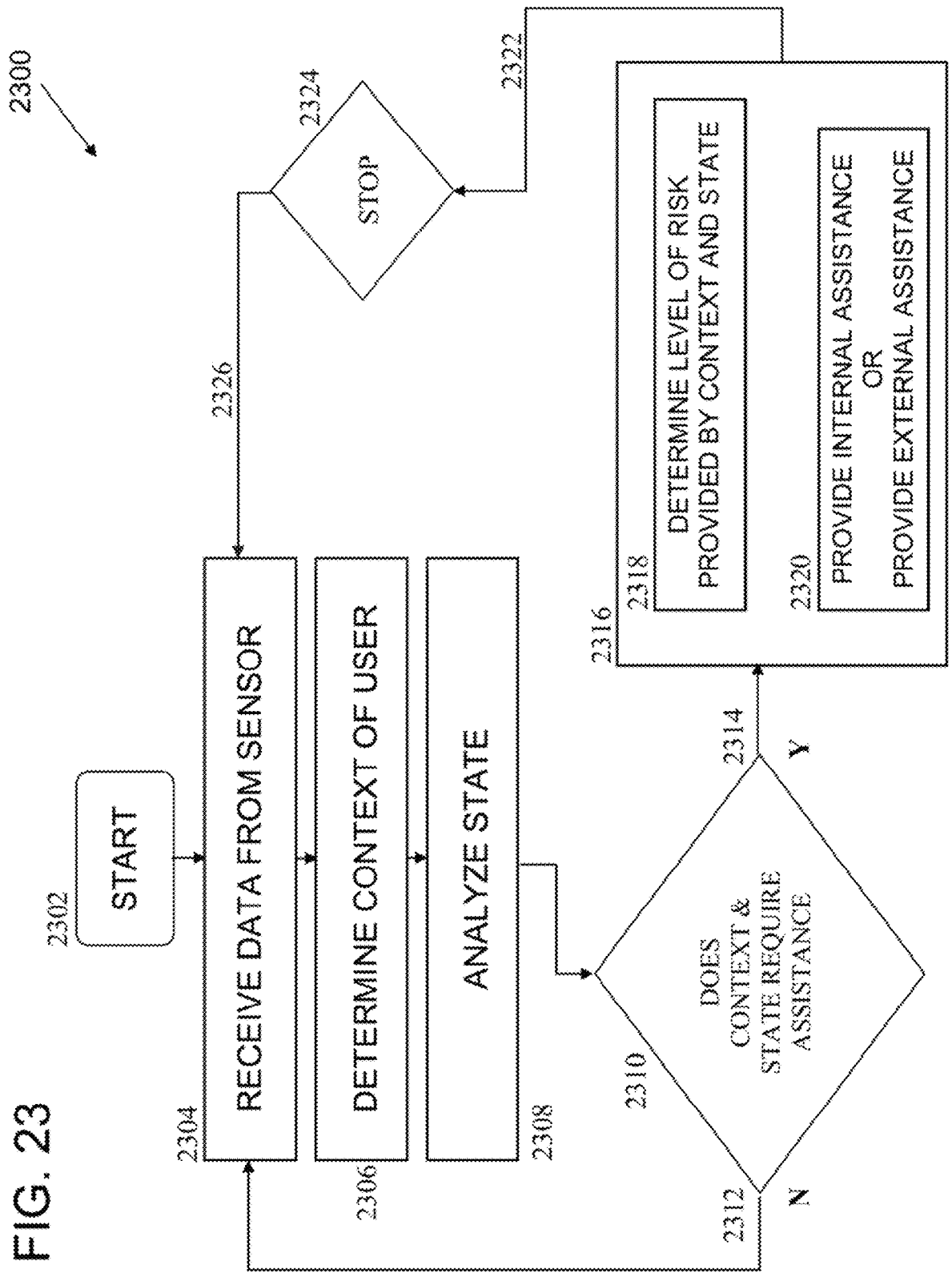
FIG. 23 illustrates a method that provides different levels of assistance to a user of an eyewear device, according to embodiments of the invention.

FIG. 23 illustrates, generally at 2300, a procedure that provides different levels of assistance to a user of an eyewear device, according to embodiments of the invention. With reference to FIG. 23, the process 2300 includes both determination of context for the user and analysis of a state of the user before assistance is rendered to the user. A process starts at a block 2302. At a block 2304, data is received from one or more sensors associated with an eyewear device. The eyewear device can be any of the eyewear devices described above, such as a modular reconfigurable eyewear device utilizing one or more temple insert modules (TIM) or a modularized eyewear device fitted with a behind the neck module assembly. In addition, the eyewear device need not be a modularized device, the eyewear device can be an eyewear device designed without modularity.

The one or more sensors in the block 2304 can be, for example, without limitation any sensor or combination of sensors described above, including camera(s), microphone(s), global position system (GPS) receiver, a multiaxis inertial measurement unit(s) containing accelerometers, gyroscopes, magnetometers, proximity sensor(s), motion sensor(s), gyroscope(s), magnetometer(s), display(s), temperature sensor(s), pressure sensor(s), infrared sensor(s), biometric sensor(s), biomechanical sensor(s), such as but not limited to Electrodermal Activity (EDA) sensor(s) including but not limited to Galvanic Skin Response (GSR) sensor(s), heart rate sensor(s), breathing rate sensor(s), etc. Thus, in various embodiments, roll, pitch, heading, position, and velocity of a user wearing an eyewear device are available through data output from sensors in the block 2304.

At a block 2306 a context of the user is determined. As used in this description of embodiments, context of a user includes a physical orientation, an activity, and an environment that the user is in. A user's context can change as a function of time and can be a dynamic property or it can be a static property. Context of a user has been described more fully above in conjunction with FIG. 18. The context is determined with the data received in the block 2304.

At a block 2308 a state of the user is analyzed. A user's state can change as a function of time and can be a dynamic property or it can be a static property. A state of a user has been described more fully above in conjunction with FIG. 20 and FIG. 21. The state is analyzed with the data received in the block 2304. At the block 2310, the algorithm determines whether or not the context/state combination requires assistance. If the answer is no, then control transfers at 2312 and additional data is collected at 2304 and the context and state blocks are revisited until a context and state analysis together with current data justifies rendering assistance to the user at 2314. Control then passes to the block 2316 and the algorithm determines a level of assistance to render to the user.

The algorithm determines at 2318 a level of risk associated with a user's context, the user's state, and the current data to determine appropriate assistance to render to the user. This determination is done with respect to a combination of predetermined ranges for variables associated with the user and in some embodiments, artificial intelligence methods including machine learning techniques are applied to a user and the data to improve and to update a personalized analysis framework for an individual user. Based on the analysis, a determination of a level of assistance to provide to the user is made at the block 2320. The assistance can be in the form of an audio message broadcast from a speaker embedded in the eyewear device to remind the user of a negative condition that the user is experiencing based on an analysis of the context, state, and the data from the sensor(s) and or provided digitally through a compatible application on a smart mobile device or computing platform. In addition, thereto, assistance can be in a form of personal assistance, whereby the user is contacted by telephone, or personal assistance whereby a person actually comes to the user in person based on the context, state, and current form of the data. For example, a user whose context is sitting in a wheelchair, activity is eating, environment is indoor setting and whose velocity is 15 miles/per/hour (MPH) presents a high level of risk, a runaway wheelchair, thereby justifying an all hands-on deck response. For example, audio assistance to the eyewear device and an immediate personal visit.

Control of an algorithm implementing the process of 2300 can continuously loop as indicated at 2322, to receive data at the block 2304, determine context at the block 2306, analyze a user's state at the block 2308, and provide assistance as needed at the block 2310/2316. Thereby providing real-time assistance to the user based on the user's changing context and state as a function of time. Alternatively, criteria can arise at 2324 which stops the process.

The process stops at the block 2324. A trigger to stop the process at the block 2324 can be when the user removes the eyewear device from the user's head. Such an event can be ascertained by the system through an output from a proximity sensor, indicating that the user's head is no longer proximate to the eyewear device. In another nonlimiting example, the process stops at the block 2324 when the user moves the temples of an eyewear device into a closed position, thereby shutting the system off through a switch triggered by closing a temple(s). Alternatively, the system can be powered down by voice command. These examples of initiating the block 2324 are given merely for illustration and do not limit embodiments of the invention.

FIG. 24 illustrates, generally at 2400, a system for providing assistance to a user of an eyewear device, according to embodiments of the invention. With reference to FIG. 24, an eyewear device is illustrated at 2402. The eyewear device 2402 is configured with embedded sensors 2404, 2406, through 2408. An optional local sensor 2412 is illustrated that can function as part of the sensors that are in communication with the eyewear device 2402. In one or more embodiments sensor 2404 is a camera pointing to a left direction relative to a user, sensor 2406 is a camera pointing forward of the user, and sensor 2408 is a camera pointing to a right side of a user. Individually or together, outputs from one or more cameras are used to determine a context for the user through image analysis. Image analysis along with other sensor data such as microphone data can be used by a system to determine a context for a user, such as but not limited to a football game, a bar, a library, etc. Remote hardware and services are illustrated by 2414 that can engage one or more persons 2416 to provide assistance to a user of the eyewear 2402. Assistance to a user is indicated as audio feedback 2410 that is broadcast to the user via one or more speakers embedded in the eyewear 2402.

The one or more persons 2416 can be a family member(s), a professional person such as doctor, nurse, nursing home personnel, etc. providing assistance to the user responsive to the system's output from analysis of sensor data with one or more of user context, user state or the combination of sensor data with user context and user state as described above in conjunction with the preceding figures.

As described herein, in various embodiments, eyewear devices are described that provide various types of assistance to a user. By using one sensor or a plurality of sensors embedded within an eyewear device or sensors used within the eyewear device's sensor system (embedded as well as external sensors) a user's context and or state are determined, and relevant assistance is generated and provided to the user to correct a negative condition or to enhance a positive condition. Within several nonlimiting examples, provided merely for illustration, and with no limitation implied thereby, an eyewear device tracks posture and movement of a user's head and then provides reminders (assistance) to the user for the context of: (1) the user is playing a video game and his or her head is nodding down while playing resulting in incorrect posture that can harm the neck. The system provides a reminder (assistance) of the potential harm and makes a suggestion to alleviate a negative health outcome from the activity. (2) The user's head is leaning to one side and is not centered. The user might not even be aware of such a misalignment. The system provides a reminder (assistance) of the potential harm and makes a suggestion aimed at alleviating a negative health outcome from the activity. (3) Incorrect posture is detected for a period of time. The system provides a reminder (assistance) to the user recommending periodic stretches to alleviate potential negative health outcome from the activity. (4) Reminders (assistance) can be generated in preventive fashion to avoid a negative future outcome. Such as when a user is engaged in an activity that spans a long time. In order to avoid fatigue, in one or more embodiments, the system provides assistance to the user such as placing a phone call to the user. For example, in one non-limiting example provided only for illustration, the system can generate an audio communication that is broadcast in the embedded speaker that communicates: "you have been driving for seven hours I think that you might need a cup of coffee, there is an exit coming up in 10 miles it might be a good idea to take a break at that exit." (5) Movements and positions of a user's head are monitored during driving. Certain head angles held for a prolonged period of time can indicate an unsafe condition, such as the user has fallen asleep, in various embodiments, the system provides assistance to "wake the user up." Such assistance can be in a form of an audio broadcast through an embedded speaker(s), vibration of the eyewear through a built-in transducer that provides vibration. Illumination of the user's eye, via a display incorporated with the eyewear. In some embodiments, the eyewear is in communication with one or more of the vehicle's systems, such as a horn, configured as external sensors or external device. The algorithm, in such a case, uses the vehicle's horn to wake the user up in order to avoid a negative condition such as an accident. Accordingly, in various embodiments, the reminders (assistance) can be audio reminders broadcast to the user through embedded speaker(s) and or reminders via a display such as a heads-up display described above, or reminders provided through external sensors that are in communication with the eyewear system.

Accordingly, the procedures described herein describe a user by a number of dimensions that are expressed by the data, the context, and the state of the user as a function of time. Within a range of a given set of dimensions, positive conditions or safe zones exist. Similarly, within the range of possible dimensions, negative conditions and potentially unsafe zones exist. In some embodiments, the safe zones and the unsafe zones are known a priori. In other embodiments, the safe zones and the unsafe zones are learned over time and are not known a priori. And in some embodiments, the safe zones and unsafe zones are a combination of information that is known a priori and is learned information over time. The safe zones and unsafe zones are used during analysis of the data to formulate relevant assistance to a user based on data collected, and one or more of a user's context and a user's state. The procedures are flexible and can be used for any context and or state, and any data relevant to a user.

For purposes of discussing and understanding the different embodiments, it is to be understood that various terms are used by those knowledgeable in the art to describe techniques and approaches. Furthermore, in the description, for purposes of explanation, numerous specific details are set forth in order to provide a thorough understanding of an embodiment. It will be evident, however, to one of ordinary skill in the art that an embodiment may be practiced without these specific details. In some instances, well-known structures and devices are shown in block diagram form, rather than in detail, in order to avoid obscuring various embodiments. These embodiments are described in sufficient detail to enable those of ordinary skill in the art to practice the invention, and it is to be understood that other embodiments may be utilized, and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), dynamic random access memories (DRAM), electrically programmable read-only memories (EPROM)s, electrically erasable programmable read-only memories (EEPROMs), FLASH memories, magnetic or optical cards, RAID, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the embodiments can be implemented in hard-wired circuitry, by programming a general-purpose processor, or by any combination of hardware and software. One of ordinary skill in the art will immediately appreciate that the embodiments can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The embodiments can also be practiced in distributed computing environments where tasks are performed by remote processing devices that are linked through a communications network.

The methods herein may be implemented using computer software. If written in a programming language conforming to a recognized standard, sequences of instructions designed to implement the methods can be compiled for execution on a variety of hardware platforms and for interface to a variety of operating systems. In addition, the embodiments are not described with reference to any particular programming language. It will be appreciated that a variety of programming languages may be used to implement the teachings of the embodiments as described herein. Furthermore, it is common in the art to speak of software, in one form or another (e.g., program, procedure, application, driver . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical representation in at least hardware and/or software (such as a computer system in which the techniques of the present invention may be practiced as well as implemented as an embodiment).

Non-transitory machine-readable media is understood to include any mechanism for storing information (such as program code, etc.) in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described but can be practiced with modification and alteration within the spirit and scope of the appended claims. The description is thus to be regarded as illustrative instead of limiting.

What is claimed is:

1. A method to provide assistance to a user through an eyewear device, comprising;
   receiving first data from a first sensor, the first sensor is incorporated into the eyewear device, the first sensor measures a parameter related to the user;
   receiving second data from a second sensor, wherein the second sensor is an external sensor;
   analyzing a state of the user, wherein the analyzing uses the first data and the second data;
   determining a context of the user, wherein determining uses the first data and the second data; and
   providing assistance to the user, wherein the assistance is in a form of feedback, and wherein the feedback is related to the state and the context.

2. The method of claim 1, wherein a first element of the context is a physical orientation of the user.

3. The method of claim 2, wherein a second element of the context is an activity that the user is doing.

4. The method of claim 2, wherein a third element of the context is the user's environment.

5. The method of claim 1, wherein the assistance is in a form of audio communication for the user.

6. A computer readable storage medium storing program code for causing a data processing system to perform steps comprising:
   receiving first data from a first sensor, the first sensor is incorporated into an eyewear device, the first sensor measures a parameter related to a user;
   receiving second data from a second sensor, wherein the second sensor is an external sensor;
   determining a context of the user, wherein the determining uses the first data and the second data; and
   providing assistance to the user, wherein the assistance is related to the context, and wherein the assistance is in a form of audio communication to the user.

7. The computer readable storage medium of claim 6, wherein a first element of the context is a physical orientation of the user.

8. The computer readable storage medium of claim 6, wherein a second element of the context is an activity that the user is doing.

9. The computer readable storage medium of claim 6, wherein a third element of the context is the user's environment.

10. The computer readable storage medium of claim 6, further comprising:
    analyzing a state of the user, wherein the analyzing uses the first data and the assistance is related to both the state and the context.

11. A system for execution by a data processing system to provide assistance to a user through an eyewear device, comprising:
    a voice interface, the voice interface has a microphone and a speaker, the voice interface to receive user commands and to provide assistance to the user;
    a sensor data input, the sensor data input to receive sensor data;
    a processor, the processor is in electrical communication with the voice interface and the sensor data; and
    a computer program for processing the sensor data, the computer program and the processor to cause the data processing system to perform steps comprising:

receiving first data from a first sensor, the first sensor is incorporated into the eyewear device, the first sensor measures a parameter related to the user;

receiving second data from a second sensor, wherein the second sensor is an external sensor;

determining a context for the user, wherein the determining uses the first data and the second data;

analyzing a state of the user, wherein the analyzing uses the first data and the second data; and providing assistance to the user, the assistance is related to the context and the state.

12. The system of claim 11, wherein the analyzing considers a category selected from the group consisting of health, wellbeing, safety, cognitive, physical, and emotional.

13. The system of claim 11, wherein the assistance is designed to help the user correct a negative condition.

14. The system of claim 11, wherein the assistance is designed to help the user by encouraging a positive condition.

15. The system of claim 13, the system further comprising:

a device, the device is external to the eyewear device, the device is in electrical communication with the eyewear device and the device is used to provide the assistance to the user.

16. The system of claim 11, the steps further comprising:

receiving third data from a plurality of embedded sensors, the determining uses both the first data and the third data and the analyzing uses both the first data and the third data.

* * * * *